US008799452B2

(12) United States Patent
Takahashi

(10) Patent No.: US 8,799,452 B2
(45) Date of Patent: Aug. 5, 2014

(54) IMAGE FORMING APPARATUS, MANAGEMENT APPARATUS, AND MANAGEMENT SYSTEM FOR MANAGING IMAGE FORMING APPARATUS

(75) Inventor: Yumiko Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 749 days.

(21) Appl. No.: 12/696,728

(22) Filed: Jan. 29, 2010

(65) Prior Publication Data

US 2010/0198967 A1 Aug. 5, 2010

(30) Foreign Application Priority Data

Feb. 2, 2009 (JP) .................................. 2009-021554

(51) Int. Cl.
*G06F 15/173* (2006.01)
*G06F 11/34* (2006.01)
*H04L 12/24* (2006.01)

(52) U.S. Cl.
CPC ........ *G06F 11/3476* (2013.01); *G06F 11/3495* (2013.01); *H04L 41/06* (2013.01)
USPC .............................. 709/224; 709/223; 714/48

(58) Field of Classification Search
CPC .. G06F 11/3476; G06F 11/3495; H04L 41/06
USPC ..................................... 709/224, 223; 714/48
See application file for complete search history.

(56) References Cited

U.S. PATENT DOCUMENTS

| 6,889,264 | B2 * | 5/2005 | Clough et al. | 710/15 |
|---|---|---|---|---|
| 6,973,597 | B2 * | 12/2005 | Schroath et al. | 714/44 |
| 6,992,787 | B2 * | 1/2006 | Fredlund et al. | 358/1.15 |
| 2002/0181009 | A1 * | 12/2002 | Fredlund et al. | 358/1.15 |
| 2003/0105995 | A1 * | 6/2003 | Schroath et al. | 714/48 |
| 2004/0073720 | A1 * | 4/2004 | Clough et al. | 710/15 |
| 2007/0293232 | A1 * | 12/2007 | Nonaka | 455/450 |
| 2008/0052112 | A1 * | 2/2008 | Zahlmann et al. | 705/2 |
| 2012/0218578 | A1 * | 8/2012 | Tanaka | 358/1.13 |

FOREIGN PATENT DOCUMENTS

EP  1785866 A1 *  5/2007
JP  2000-148431 A   5/2000

* cited by examiner

*Primary Examiner* — Kenneth Coulter
(74) *Attorney, Agent, or Firm* — Canon USA, Inc., IP Division

(57) ABSTRACT

In an image forming apparatus, when a plurality of events are detected within a predetermined period of time, event relevant information is not transmitted for all of the detected events and the same event ID is set for event information so that event relevant information which is transmitted at least once can be associated with the plurality of events. In a management apparatus, the event information and the event relevant information which have the same event ID are managed in association with each other.

14 Claims, 33 Drawing Sheets

FIG.5

| SETTING CHANGE DATA ID 503 | | | |
|---|---|---|---|
| START VALUE | END VALUE | DETAILS | |
| 1.10.1.1 | 1.10.9.9 | IMAGE FORMATION ADJUSTMENT VALUE | |
| ... | ... | ... | |
| ERROR CODE | | | |
| START VALUE | END VALUE | DETAILS | |
| E000-0000 | E00F-9999 | FIXING DEVICE ERROR | |
| E020-0000 | E020-9999 | DEVELOPING DEVICE ERROR | |
| E060-0000 | E06F-9999 | CHARGING RELATED ERROR | |
| ... | ... | ... | |

FIG.6

IN CASE OF ERROR GENERATION

601

| MAJOR ITEM | MEDIUM ITEM | MINOR ITEM | NOTIFICATION CONTENTS DETAILED CONTENT | DATA ID |
|---|---|---|---|---|
| BBB (MEASUREMENT VALUE) | XXX (SENSOR MEASUREMENT VALUE) | XXX-1 | MACHINE INSIDE TEMPERATURE | 1.1.4.1 |
| | | XXX-2 | MACHINE INSIDE MOISTURE | 1.1.4.2 |
| | | XXX-3 | PHOTOSENSITIVE DRUM AMBIENT TEMPERATURE | 1.1.4.3 |
| | | XXX-4 | Y COLOR PHOTOSENSITIVE DRUM HEATER TEMPERATURE | 1.1.4.4 |
| | | XXX-5 | M COLOR PHOTOSENSITIVE DRUM HEATER TEMPERATURE | 1.1.4.5 |
| | | XXX-6 | C COLOR PHOTOSENSITIVE DRUM HEATER TEMPERATURE | 1.1.4.6 |
| | | XXX-7 | K COLOR PHOTOSENSITIVE DRUM HEATER TEMPERATURE | 1.1.4.7 |
| | | XXX-8 | FIXING ROLLER SURFACE TEMPERATURE | 1.1.4.11 |
| | | XXX-9 | DRUM SURFACE TEMPERATURE | 1.1.4.12 |
| | YYY (VOLTAGE/ CURRENT MEASUREMENT VALUE) | YYY-1 | DOCUMENT ILLUMINATION LAMP VOLTAGE DISPLAY [V] | 1.1.5.2 |
| | | YYY-2 | TRANSFER CHARGING DEVICE CURRENT VALUE | 1.1.5.3 |
| | | YYY-3 | SECONDARY TRANSFER ROLLER CURRENT VALUE | 1.1.5.4 |
| | | YYY-4 | PRIMARY TRANSFER ROLLER CURRENT VALUE | 1.1.5.5 |
| | ZZZ (PHOTOSENSITIVE DRUM CONTROL DATA) | ZZZ-1 | Y COLOR PHOTOSENSITIVE DRUM SURFACE POTENTIAL | 1.1.7.3 |
| | | ZZZ-2 | M COLOR PHOTOSENSITIVE DRUM SURFACE POTENTIAL | 1.1.7.6 |
| | | ZZZ-3 | C COLOR PHOTOSENSITIVE DRUM SURFACE POTENTIAL | 1.1.7.9 |
| | | ZZZ-4 | K COLOR PHOTOSENSITIVE DRUM SURFACE POTENTIAL | 1.1.7.15 |
| | WWW (DEVELOPING DEVICE) | WWW-1 | CALCULATION VALUE OF DEVELOPER DENSITY | 1.1.8.1 |
| | | WWW-2 | TARGET VALUE (Y) OF DEVELOPER DENSITY | 1.1.8.2 |
| | | WWW-3 | TARGET VALUE (M) OF DEVELOPER DENSITY | 1.1.8.3 |
| | | WWW-4 | TARGET VALUE (C) OF DEVELOPER DENSITY | 1.1.8.4 |
| | | WWW-5 | MEASUREMENT VALUE (Y) OF DEVELOPER DENSITY | 1.1.8.5 |
| | | WWW-6 | MEASUREMENT VALUE (M) OF DEVELOPER DENSITY | 1.1.8.6 |
| | | WWW-7 | MEASUREMENT VALUE (C) OF DEVELOPER DENSITY | 1.1.8.7 |
| ... | ... | ... | ... | ... |

IN CASE OF SETTING CHANGE

602

| MAJOR ITEM | MEDIUM ITEM | MINOR ITEM | NOTIFICATION CONTENTS DETAILED CONTENT | DATA ID |
|---|---|---|---|---|
| AAA (SETTING VALUE) | VVV (IMAGE FORMATION SETTING VALUE) | VVV-1 | OFFSET OF DOCUMENT ILLUMINATION LAMP | 1.10.1.1 |
| | | VVV-2 | IMAGE READING START POSITION (Y DIRECTION) ADJUSTMENT VALUE | 1.10.1.2 |
| | | VVV-3 | TONER REPLENISHING AMOUNT ADJUSTMENT (Y COLOR) | 1.10.1.3 |
| | | VVV-4 | TONER REPLENISHING AMOUNT ADJUSTMENT (M COLOR) | 1.10.1.4 |
| | | VVV-5 | TONER REPLENISHING AMOUNT ADJUSTMENT (C COLOR) | 1.10.1.5 |
| | | VVV-6 | TONER REPLENISHING AMOUNT ADJUSTMENT (K COLOR) | 1.10.1.6 |
| | | ... | ... | ... |
| ... | ... | ... | ... | ... |

FIG.7

| ITEM | CONTENTS | |
|---|---|---|
| | | ~701 |
| GENERATION DATE AND TIME | 2008/5/15 11:49 | ~702 |
| TOTAL COUNTER | 12345678 | ~703 |
| ERROR CODE | E062-0001 | ~704 |

FIG.8

| ITEM | CONTENTS | |
|---|---|---|
| | | ~801 |
| ERROR GENERATION DATE AND TIME | 2008/5/15 11:48 | ~802 |
| ERROR CODE | E062-0009 | ~803 |
| EVENT ID | 4501 | ~804 |

FIG.9

| ITEM | CONTENTS | |
|---|---|---|
| DEVICE ID | DEV00001 | ~901 |
| GENERATION DATE AND TIME | 2008/5/15 11:49 | ~902 |
| TOTAL COUNTER | 12345678 | ~903 |
| ERROR CODE | E062-0001 | ~904 |
| EVENT ID | 4501 | ~905 |

FIG.10

| ITEM | CONTENTS | |
|---|---|---|
| DEVICE ID | DEV00001 | ~1002 |
| TRANSMISSION DATE AND TIME | 2008/5/15 11:49 | ~1003 |
| TOTAL COUNTER | 12345678 | ~1004 |
| EVENT ID | 4501 | ~1005 |
| APPARATUS INFORMATION | | ~1006 |
| DATA ID | VALUE | |
| 1.1.4.1 | 40 | |
| 1.1.4.2 | 50 | |
| 1.1.4.3 | 60 | |
| 1.1.4.4 | 70 | |
| 1.1.4.5 | 80 | |
| 1.1.4.6 | 90 | |
| 1.1.4.7 | 100 | |
| 1.1.4.9 | 150 | |
| 1.1.4.10 | 200 | |
| 1.1.4.11 | 300 | |
| 1.1.4.12 | 500 | |
| . . . | . . . | |

(header row marker ~1001)

FIG.14

ERROR HISTORY OF IMAGE
FORMING APPARATUS (ID: DEV00001)                    1401

| ERROR HISTORY | | | |
|---|---|---|---|
| ERROR GENERATION DATE AND TIME | TOTAL COUNTER | ERROR CODE | EVENT ID |
| 2008/5/15 11:48 | 12345678 | E062-0009 | 4501 |
| 2008/5/10 8:30 | 12200000 | E020-0002 | 4480 |
| 2008/3/17 19:14 | 11876543 | E700-0001 | — |
| . . . | . . . | . . . | . . . |

FIG.15

VARIOUS SETTING VALUES FOR IMAGE FORMING APPARATUS 101 (ID: DEV00001)

1501

SETTING VALUE RELATED TO IMAGE FORMATION

| MAJOR ITEM | MEDIUM ITEM | MINOR ITEM | DETAILED CONTENT | DATA ID | INITIAL VALUE | LATEST VALUE |
|---|---|---|---|---|---|---|
| AAA (SETTING VALUE) | VVV (IMAGE FORMATION SETTING VALUE) | VVV-1 | OFFSET OF DOCUMENT ILLUMINATION LAMP | 1.10.1.1 | 10 | 15 |
| | | VVV-2 | IMAGE READING START POSITION (Y DIRECTION) ADJUSTMENT VALUE | 1.10.1.2 | 5 | 8 |
| | | VVV-3 | TONER REPLENISHING AMOUNT ADJUSTMENT (Y COLOR) | 1.10.1.3 | 8 | 10 |
| | | VVV-4 | TONER REPLENISHING AMOUNT ADJUSTMENT (M COLOR) | 1.10.1.4 | 9 | 11 |
| | | VVV-5 | TONER REPLENISHING AMOUNT ADJUSTMENT (C COLOR) | 1.10.1.5 | 8 | 8 |
| | | VVV-6 | TONER REPLENISHING AMOUNT ADJUSTMENT (K COLOR) | 1.10.1.6 | 9 | 13 |
| ... | ... | ... | ... | ... | ... | ... |

FIG.16

ENVIRONMENTAL INFORMATION OF IMAGE FORMING APPARATUS (ID: DEV00001)

| LINK ID | 4501 | ~1601 | | | 1602 |
|---|---|---|---|---|---|
| ENVIRONMENTAL INFORMATION ||||||
| MAJOR ITEM | MEDIUM ITEM | MINOR ITEM | DETAILED CONTENT | DATA ID | VALUE |
| BBB (MEASUREMENT VALUE) | XXX (SENSOR MEASUREMENT VALUE) | XXX-1 | MACHINE INSIDE TEMPERATURE | 1.1.4.1 | 40 |
| | | XXX-2 | MACHINE INSIDE MOISTURE | 1.1.4.2 | 50 |
| | | XXX-3 | PHOTOSENSITIVE DRUM AMBIENT TEMPERATURE | 1.1.4.3 | 60 |
| | | XXX-4 | Y COLOR PHOTOSENSITIVE DRUM HEATER TEMPERATURE | 1.1.4.4 | 70 |
| | | XXX-5 | M COLOR PHOTOSENSITIVE DRUM HEATER TEMPERATURE | 1.1.4.5 | 80 |
| | | XXX-6 | C COLOR PHOTOSENSITIVE DRUM HEATER TEMPERATURE | 1.1.4.6 | 90 |
| | | XXX-7 | K COLOR PHOTOSENSITIVE DRUM HEATER TEMPERATURE | 1.1.4.7 | 100 |
| | | XXX-8 | UPPER FIXING ROLLER TEMPERATURE | 1.1.4.9 | 150 |
| | | XXX-9 | LOWER FIXING ROLLER TEMPERATURE | 1.1.4.10 | 200 |
| | YYY (VOLTAGE/ CURRENT MEASUREMENT VALUE) | YYY-1 | FIXING ROLLER SURFACE TEMPERATURE | 1.1.4.11 | 300 |
| | | YYY-2 | DRUM SURFACE TEMPERATURE | 1.1.4.12 | 500 |
| | | YYY-3 | DOCUMENT ILLUMINATION LAMP VOLTAGE DISPLAY [V] | 1.1.5.2 | 1.5 |
| | | YYY-4 | TRANSFER CHARGING UNIT CURRENT VALUE | 1.1.5.3 | 500 |
| | ZZZ (PHOTOSENSITIVE DRUM CONTROL DATA) | ZZZ-1 | SECONDARY TRANSFER ROLLER CURRENT VALUE | 1.1.5.4 | 500 |
| | | ZZZ-2 | PRIMARY TRANSFER ROLLER CURRENT VALUE | 1.1.5.5 | 500 |
| | | ZZZ-3 | Y COLOR PHOTOSENSITIVE DRUM SURFACE POTENTIAL | 1.1.7.3 | 1.3 |
| | | ZZZ-4 | M COLOR PHOTOSENSITIVE DRUM SURFACE POTENTIAL | 1.1.7.6 | 1.2 |
| | WWW (DEVELOPING DEVICE) | WWW-1 | C COLOR PHOTOSENSITIVE DRUM SURFACE POTENTIAL | 1.1.7.9 | 1 |
| | | WWW-2 | K COLOR PHOTOSENSITIVE DRUM SURFACE POTENTIAL | 1.1.7.15 | 1.5 |
| | | WWW-3 | CALCULATION VALUE OF DEVELOPER DENSITY | 1.1.8.1 | 100 |
| | | WWW-4 | TARGET VALUE (Y) OF DEVELOPER DENSITY | 1.1.8.2 | 100 |
| | | WWW-5 | TARGET VALUE (M) OF DEVELOPER DENSITY | 1.1.8.3 | 100 |
| | | WWW-6 | TARGET VALUE (C) OF DEVELOPER DENSITY | 1.1.8.4 | 100 |
| | | WWW-7 | MEASUREMENT VALUE (Y) OF DEVELOPER DENSITY | 1.1.8.5 | 90 |
| ... | ... | ... | ... | ... | ... |

APPARATUS INFORMATION (ENVIRONMENTAL INFORMATION) ~2301

| Customer Information | Contact (Device) | | Contact (RDS) | |
|---|---|---|---|---|
| Name: Canon Inc. Customer1 | Name: | N/A | Name: | Contact |
| Customer ID: TEST1 | Tel: | N/A | Tel: | 111 |
| Address1: 246 | Mobile Phone Number: | N/A | Mobile Phone Number: | 222 |
| Address2: 246 | Fax: | N/A | Fax: | 222 |
| Address3: 246 | E-mail Address: | N/A | E-mail Address: | N/A |
| Address4: 246 | Device Installation Location: | N/A | RDS Installation Location: | N/A |
| Zip Code: 1111 | Building Name: | N/A | Building Name: | Canon Inc (OIPQA) |
| Time Zone: JAPAN | Address1: | | Address1: | 246 |
| Contract Type: VIP | Address2: | | Address2: | 246 |
| | Address3: | | Address3: | 246 |
| | Address4: | | Address4: | 246 |
| | Zip Code: | | Zip Code: | 1111 |

~2302

MAJOR ITEM
[BBB]

APPARATUS INFORMATION (SETTING VALUE) ~2303

DEV ID: DEV00001  Product Name: type00001

| MEDIUM ITEM | MINOR ITEM | INITIAL VALUE | CURRENT VALUE ~2304 |
|---|---|---|---|
| | SET DATE | 2006-01-01 | 2008-03-25 |
| | TOTAL COUNTER | 000006 | 234888 |
| ANALOG>XXX>YYY>ZZZ | TEMP | 24°C | 25°C |
| | HUM | 33% | 34% |
| | ABS-HUM | 6.0g | 7.0g |
| | ITB-POST | 30A | 40A |
| HV-STS | PRIMARY | 10μA | 20μA |
| | PRI-GRID | 20V | 30V |

FIG.24

APPARATUS INFORMATION (SETTING VALUE)

Customer Information ~2401

| | |
|---|---|
| Name: | Canon Inc. Customer1 |
| Customer ID: | TEST1 |
| Address1: | 246 |
| Address2: | 246 |
| Address3: | 246 |
| Address4: | 1111 |
| Zip Code: | JAPAN |
| Time Zone: | |
| Contract Type: | VIP |

Contact (Device)

| | |
|---|---|
| Name: | N/A |
| Tel: | N/A |
| Mobile Phone Number: | N/A |
| Fax: | N/A |
| E-mail Address: | N/A |
| Device Installation Location: | N/A |
| Building Name: | N/A |
| Address1: | N/A |
| Address2: | N/A |
| Address3: | N/A |
| Address4: | N/A |
| Zip Code: | N/A |

Contact (RDS) ~2402

| | |
|---|---|
| Name: | Contact |
| Tel: | 111 |
| Mobile Phone Number: | 222 |
| Fax: | 222 |
| E-mail Address: | N/A |
| RDS Installation Location: | N/A |
| Building Name: | Canon Inc (OIPQA) |
| Address1: | 246 |
| Address2: | 246 |
| Address3: | 246 |
| Address4: | 246 |
| Zip Code: | 1111 |

MAJOR ITEM
[AAA]

APPARATUS INFORMATION (ENVIRONMENTAL INFORMATION) ~2403

DEV ID: DEV00001  Product Name: type00001

~2404

| MEDIUM ITEM | MINOR ITEM | INITIAL VALUE | CURRENT VALUE |
|---|---|---|---|
| | SET DATE | 2006-01-01 | 2008-03-25 |
| | TOTAL COUNTER | 000006 | 234888 |
| ADJ-XY>XX-X>YY-Y | ADJ-X | 18 | 19 |
| | ADJ-Y | 58 | 58 |
| | ADJ-S | 150 | 154 |
| | ADJ-Y-DF | 102 | 102 |
| CCD | W-PLT-X | 8163 | 8163 |
| | W-PLT-Y | 8621 | 8621 |

FIG.25

| SETTING CHANGE DATA ID | | | | ~2501 |
|---|---|---|---|---|
| START VALUE | END VALUE | DETAILS | LIST NUMBER | |
| 1.10.1.1 | 1.10.9.9 | IMAGE FORMATION ADJUSTMENT VALUE | 100 | |
| ... | ... | ... | ... | |
| ERROR CODE | | | | ~2502 |
| START VALUE | END VALUE | DETAILS | LIST NUMBER | |
| E000-0000 | E00F-9999 | FIXING DEVICE ERROR | 500 | |
| E020-0000 | E020-9999 | DEVELOPING DEVICE ERROR | 600 | |
| E060-0000 | E06F-9999 | CHARGING RELATED ERROR | 600 | |
| ... | ... | ... | ... | |

FIG.26

LIST NUMBER: 500 — 2601

| MAJOR ITEM | MEDIUM ITEM | MINOR ITEM | DETAILED CONTENT | DATA ID |
|---|---|---|---|---|
| | | | NOTIFICATION CONTENTS | |
| BBB (MEASUREMENT VALUE) | XXX (SENSOR MEASUREMENT VALUE) | XXX-1 | MACHINE INSIDE TEMPERATURE | 1.1.4.1 |
| | | XXX-2 | MACHINE INSIDE MOISTURE | 1.1.4.2 |
| | | XXX-3 | PHOTOSENSITIVE DRUM AMBIENT TEMPERATURE | 1.1.4.3 |
| | | XXX-4 | Y COLOR PHOTOSENSITIVE DRUM HEATER TEMPERATURE | 1.1.4.4 |
| | | XXX-5 | M COLOR PHOTOSENSITIVE DRUM HEATER TEMPERATURE | 1.1.4.5 |
| | | XXX-6 | C COLOR PHOTOSENSITIVE DRUM HEATER TEMPERATURE | 1.1.4.6 |
| | | XXX-7 | K COLOR PHOTOSENSITIVE DRUM HEATER TEMPERATURE | 1.1.4.7 |
| | | XXX-8 | FIXING ROLLER SURFACE TEMPERATURE | 1.1.4.11 |
| | | XXX-9 | DRUM SURFACE TEMPERATURE | 1.1.4.12 |
| | YYY (VOLTAGE/ CURRENT MEASUREMENT VALUE) | YYY-1 | DOCUMENT ILLUMINATION LAMP VOLTAGE DISPLAY [V] | 1.1.5.2 |
| | | YYY-2 | TRANSFER CHARGING DEVICE CURRENT VALUE | 1.1.5.3 |
| | | YYY-3 | SECONDARY TRANSFER ROLLER CURRENT VALUE | 1.1.5.4 |
| | | YYY-4 | PRIMARY TRANSFER ROLLER CURRENT VALUE | 1.1.5.5 |
| | ZZZ (PHOTOSENSITIVE DRUM CONTROL DATA) | ZZZ-1 | Y COLOR PHOTOSENSITIVE DRUM SURFACE POTENTIAL | 1.1.7.3 |
| | | ZZZ-2 | M COLOR PHOTOSENSITIVE DRUM SURFACE POTENTIAL | 1.1.7.6 |
| | | ZZZ-3 | C COLOR PHOTOSENSITIVE DRUM SURFACE POTENTIAL | 1.1.7.9 |
| | | ZZZ-4 | K COLOR PHOTOSENSITIVE DRUM SURFACE POTENTIAL | 1.1.7.15 |
| ... | ... | ... | ... | ... |

LIST NUMBER: 600 — 2602

| MAJOR ITEM | MEDIUM ITEM | MINOR ITEM | DETAILED CONTENT | DATA ID |
|---|---|---|---|---|
| | | | NOTIFICATION CONTENTS | |
| BBB (MEASUREMENT VALUE) | WWW (DEVELOPING DEVICE) | WWW-1 | CALCULATION VALUE OF DEVELOPER DENSITY | 1.1.8.1 |
| | | WWW-2 | TARGET VALUE (Y) OF DEVELOPER DENSITY | 1.1.8.2 |
| | | WWW-3 | TARGET VALUE (M) OF DEVELOPER DENSITY | 1.1.8.3 |
| | | WWW-4 | TARGET VALUE (C) OF DEVELOPER DENSITY | 1.1.8.4 |
| | | WWW-5 | MEASUREMENT VALUE (Y) OF DEVELOPER DENSITY | 1.1.8.5 |
| | | WWW-6 | MEASUREMENT VALUE (M) OF DEVELOPER DENSITY | 1.1.8.6 |
| | | WWW-7 | MEASUREMENT VALUE (C) OF DEVELOPER DENSITY | 1.1.8.7 |

LIST NUMBER: 100 — 2603

| MAJOR ITEM | MEDIUM ITEM | MINOR ITEM | DETAILED CONTENT | DATA ID |
|---|---|---|---|---|
| | | | NOTIFICATION CONTENTS | |
| AAA (SETTING VALUE) | VVV (IMAGE FORMATION SETTING VALUE) | VVV-1 | OFFSET OF DOCUMENT ILLUMINATION LAMP | 1.10.1.1 |
| | | VVV-2 | IMAGE READING START POSITION (Y DIRECTION) ADJUSTMENT VALUE | 1.10.1.2 |
| | | VVV-3 | TONER REPLENISHING AMOUNT ADJUSTMENT (Y COLOR) | 1.10.1.3 |
| | | VVV-4 | TONER REPLENISHING AMOUNT ADJUSTMENT (M COLOR) | 1.10.1.4 |
| | | VVV-5 | TONER REPLENISHING AMOUNT ADJUSTMENT (C COLOR) | 1.10.1.5 |
| | | VVV-6 | TONER REPLENISHING AMOUNT ADJUSTMENT (K COLOR) | 1.10.1.6 |
| | | ... | ... | ... |
| ... | ... | ... | ... | ... |

FIG.27

| ITEM | CONTENTS | | |
|---|---|---|---|
| LIST NUMBER | 500 | 600 | ... |
| ERROR GENERATION DATE AND TIME | 2008/3/1 0:50 | 2008/3/10 11:48 | ... |
| ERROR CODE | E020-0001 | E060-0001 | ... |
| TOTAL COUNTER | 12000000 | 12345678 | ... |
| EVENT ID | 3000 | 4501 | ... |

FIG.31

ERROR HISTORY OF IMAGE  
FORMING APPARATUS (ID: DEV00001)      3101

| ERROR HISTORY | | | |
|---|---|---|---|
| ERROR GENERATION DATE AND TIME | TOTAL COUNTER | ERROR CODE | EVENT ID |
| 2008/5/15 11:49 | 12345678 | E062-0001 | 4501 |
| 2008/5/15 11:48 | 12345678 | E062-0009 | 4500 |
| 2008/5/10 8:30 | 12200000 | E020-0002 | 4499 |
| 2008/3/17 19:14 | 11876543 | E700-0001 | — |
| . . . | . . . | . . . | . . . |

IMAGE FORMING APPARATUS, MANAGEMENT APPARATUS, AND MANAGEMENT SYSTEM FOR MANAGING IMAGE FORMING APPARATUS

BACKGROUND OF THE INVENTION

1. Field of the Invention

The present invention relates to a management system that can communicate with at least one image forming apparatus via a network and can perform management and maintenance for the image forming apparatus. More specifically, the present invention relates to a technique for managing an event including failure information, such as an error generated in an image forming apparatus, together with associated apparatus relevant information (e.g., environmental measurement values and setting values in the image forming apparatus).

2. Description of the Related Art

A management system for image forming apparatuses is a system that can manage an operational status of each image forming apparatus (e.g., a printer, a copying machine, and a multifunction peripheral). The management system not only manages operational status information collected from respective image forming apparatuses but also provides various services to each image forming apparatus according to its operational status. One of the services provided by the management system is dispatching a service engineer if an operator determines that it is necessary when an error notification is received from an image forming apparatus. In this case, the service engineer confirms a state of the failure while viewing an operational status of the image forming apparatus (i.e., an object for which the service engineer performs a maintenance work) before the service engineer goes to a setup place of the image forming apparatus. Information to be confirmed beforehand by the service engineer who performs a maintenance work as described above includes, in addition to the operational information of the image forming apparatus, attribute information of the image forming apparatus that relates to the failure (error or alarm).

The information may further include history of information (presence of sheets, rotation of gear, etc) from a sensor in a printer which can be stored upon finishing a print job. The history of the information can be later displayed to let the service engineer to identify the cause of the failure.

As discussed in Japanese Patent Application Laid-open No. 2000-148431, there is a conventional system that displays, if an error is generated, information necessary to perform maintenance work considering printer unique setup environmental conditions. In the case, the system displays error accompanying information (e.g., a character string indicating a sheet stock place in case of shortage of sheets) which can be set beforehand by a user as necessary information for the printer. The printer, when an error is generated, transmits error information and error accompanying information to a management apparatus. The management apparatus can display the received error accompanying information.

According to the above-described conventional technique, the image forming apparatus transmits accompanying information to the management apparatus in response to occurrence of each failure. However, the same failure may occur repetitively within a short period of time (e.g., several minutes) after the first failure occurs in the image forming apparatus. In such a case, if the image forming apparatus transmits accompanying information relating to a generated error to the management apparatus each time the error is generated, the management apparatus frequently receives the information whose content is similar or identical. For example, according to the above-described technique discussed in Japanese Patent Application Laid-open No. 2000-148431, accompanying information is transmitted each time an error is generated. However, in a case where the same error occurs repetitively, the same accompanying information set beforehand by a user is transmitted a plurality of times, unnecessarily, in response to generated errors.

As a method for reducing an amount of information to be transmitted to the management apparatus, it may be desired to store previously transmitted information and, if presently acquired information has any difference in comparison with the already stored information, transmit the data relating to the presently acquired information to the management apparatus. However, recent image forming apparatuses include various built-in sensors from which numerous measurement values can be acquired. Accordingly, a large capacity of storage area is required for each image forming apparatus to store, as previously transmitted information, all of environmental measurement values and various setting values for the image forming apparatus.

SUMMARY OF THE INVENTION

Exemplary embodiments of the present invention are directed to a technique capable of preventing a storage area of an image forming apparatus from being overused, and capable of reducing a load of communications to be performed between the image forming apparatus and a management apparatus in transmission/reception of information required for management and maintenance for the image forming apparatus, in addition to event information including failure information.

Further, exemplary embodiments of the present invention are directed to a technique capable of flexibly managing the information required for the management and maintenance for the image forming apparatus so that the information can be easily handled, for example, when a remote maintenance operation is performed.

According to an aspect of the present invention, a management system includes a plurality of image forming apparatuses and a management apparatus that can manage the image forming apparatuses via a network. The image forming apparatus includes an acquisition unit configured to acquire environmental information including at least one of temperature, moisture, and electric potential which are measured in the image forming apparatus, a detection unit configured to detect an event, an event information transmission unit configured to transmit event information relating to the event detected by the detection unit to the management apparatus, an event relevant information transmission unit configured to transmit event relevant information to which an event ID is set when it is determined that event relevant information including the environmental information acquired by the acquisition unit is to be transmitted together with the event detected by the detection unit, and a management unit configured to manage the event ID set for the event relevant information without managing the environmental information which is included the event relevant information transmitted by the event relevant information transmission unit, wherein an event ID is set for the event information so that the management apparatus can manage the event information in association with the event relevant information, and wherein if it is determined that the event relevant information is to be transmitted together with an event newly detected by the detection unit in a case where a present event is detected within a predetermined period of time after detection of a previous event, (1) the event relevant information transmission unit does not transmit event relevant information corresponding to the present event, and (2) the event information transmission unit sets the event ID which is set for the event relevant information corresponding to the previous event managed by the management unit, as event information relating to the present event and transmits the set event information to the management apparatus. The management apparatus includes a storage unit configured to store the event information and the event relevant information received from the image forming apparatus, while associating the event information with the event relevant information based on the event ID, and a providing unit configured to provide information required to view the event information and the event relevant information stored in the storage unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates an example of a list including data ID and error codes to be transmitted.

FIG. 6 illustrates an example of lists that store information (various types of environmental information, various setting values, etc) that can be transmitted to the management apparatus.

FIG. 7 illustrates an example of a list including information relating to an error that occurred in the image forming apparatus.

FIG. 8 illustrates an example of a list including information relating to event relevant information having been transmitted in response to a previously generated error.

FIG. 9 illustrates an example of a list including error information that the image forming apparatus can transmit to the management apparatus.

FIG. 10 illustrates an example of a list including event relevant information that the image forming apparatus can transmit to the management apparatus.

FIG. 14 illustrates an example of a list including error history information relating to the image forming apparatus that can be managed by the management apparatus.

FIG. 15 illustrates an example of a list including setting values for the image forming apparatus that can be managed by the management apparatus.

FIG. 16 illustrates an example of a list including environmental information relating to the image forming apparatus that can be managed by the management apparatus.

FIG. 21 illustrates an example of screen display relating to an error history of the image forming apparatus which can be provided by the management apparatus.

FIG. 22 illustrates an example of screen display relating to detailed error information which can be provided by the management apparatus.

FIG. 23 illustrates an example of screen display relating to environmental information which can be provided by the management apparatus.

FIG. 24 illustrates an example of screen display relating to setting values which can be provided by the management apparatus.

FIG. 25 illustrates an example of a list including data ID and error codes to be transmitted according to a second exemplary embodiment of the present invention.

FIG. 26 illustrates an example of lists that store various types of information (environmental information, setting values, etc) which can be transmitted to the management apparatus, according to the second exemplary embodiment.

FIG. 27 illustrates an example of a list including information relating to event relevant information corresponding to a previously generated error according to the second exemplary embodiment.

FIG. 31 illustrates an example of a list including error history information that can be managed by the management apparatus according to a fourth exemplary embodiment of the present invention.

DESCRIPTION OF THE EMBODIMENTS

Various exemplary embodiments, features, and aspects of the present invention will be described in detail below with reference to the drawings.

Figure 1:
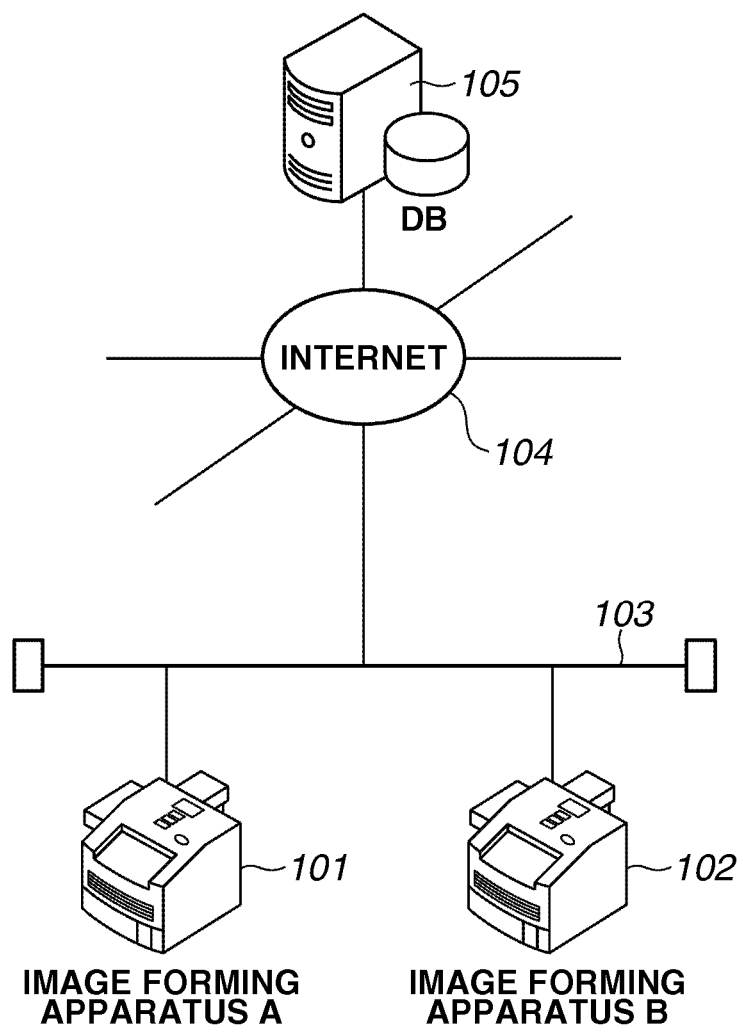
FIG. 1 illustrates a network configuration including a plurality of image forming apparatuses and a management apparatus according to an exemplary embodiment of the present invention.

An example of a client network configuration illustrated in FIG. 1 includes two image forming apparatuses 101 and 102. A multifunction peripheral (MFP) that can perform various types of (e.g., print, scan, copy, and FAX) processing or a printer is an example of the image forming apparatus illustrated in FIG. 1.

A management apparatus 105 is capable of managing one or more image forming apparatuses. The management apparatus 105 can transmit and receive information and data to and from the image forming apparatuses 101 and 102 which are connected to a network 103, and a plurality of other devices (not illustrated). The management apparatus 105 can further manage various types of information and data received from the image forming apparatuses. Although the image forming apparatuses 101 and 102 are connected to the same network (i.e., local area network (LAN)) 103, the image forming apparatuses 101 and 102 can be present on other network (e.g., external LAN) connected via Internet 104.

Figure 2:
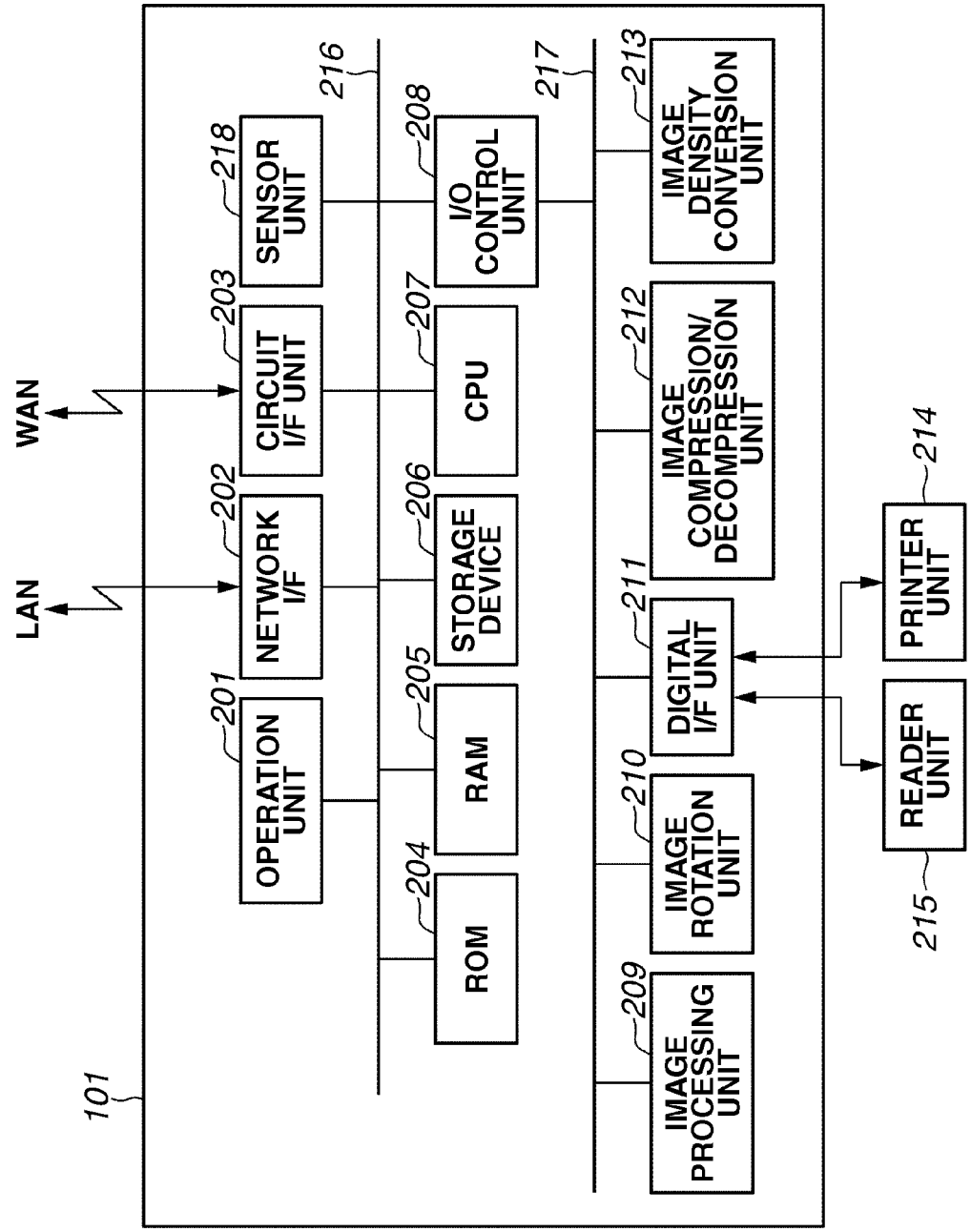
FIG. 2 is a block diagram illustrating an example of a hardware configuration of the image forming apparatus.

FIG. 2 is a block diagram illustrating an example of a hardware configuration of the image forming apparatus 101. The image forming apparatus 101 includes functional components mutually connected via a system bus 216 and an image bus 217.

A read only memory (ROM) 204 stores a control program for controlling the image forming apparatus and an image forming apparatus monitoring program which can be executed by a central processing unit (CPU) 207.

In the present exemplary embodiment, the image forming apparatus monitoring program is incorporated in the image forming apparatus 101. However, the image forming apparatus monitoring program can be incorporated in an external monitoring apparatus that is configured to acquire information from the image forming apparatus via the network.

A random access memory (RAM) 205 is a work memory area that can be used to execute the program, and is an image memory that can temporarily store status information of each image forming apparatus which is required in management to be performed by an image forming apparatus management program, and image data. A storage device 206 is a nonvolatile storage device which stores various types of information (ID, operation log, etc) that are required to be stored even after the image forming apparatus 101 is rebooted.

A network interface (I/F) 202 is an interface unit connected to the LAN. The network I/F 202 can communicate with the management apparatus 105 via the LAN. A circuit I/F unit 203 is connected to a wide area network (WAN), such as integrated services digital network (ISDN) or public telephone network. The circuit I/F unit 203 can be controlled according to a communication control program stored in the ROM 204 to perform data transmission/reception with a remote device via an ISDN I/F or a modem, or via a network control unit (NCU). The circuit I/F unit 203 can be also used to perform facsimile transmission/reception. An operation unit 201 includes a built-in display device and a built-in key input device which can be controlled by the CPU 207. An operator can perform, via the key input device, various setting instructions including scanner reading and print output instructions and operation start/stop instructions.

An input/output (I/O) control unit 208 is a bus bridge that connects the system bus 216 to the image bus 217 that can speedily transfer image data. The image bus 217 is, for example, a protocol control information (PCI) bus or an Institute of Electrical and Electronic Engineers (IEEE) 1394 bus. The following functional blocks of the image forming apparatus 101 are connected via the image bus 217.

A digital I/F unit 211 connects a control unit to a reader unit 215 and a printer unit 214 of the image forming apparatus. The digital I/F unit 211 performs synchronous/asynchronous conversion for image data. The reader unit 215 and the printer unit 214 include various sensors provided therein. Information detected by these sensors can be sent via the digital I/F unit 211 and the I/O control unit 208 to the system bus 216. An image processing unit 209 can perform correction/modification/editing processing on input and output image data. An image rotation unit 210 can rotate the image data. An image compression/decompression unit 212 can perform Joint Photographic Experts Group (JPEG) compression/decompression processing on multi-value image data and also perform Joint Bi-level Image Experts Group (JBIG)/Modified Modified Read (MMR)/Modified Read (MR)/Modified Huffman (MH) compression/decompression processing on binary image data. An image density conversion unit 213 can perform resolution conversion on output image data.

Operational information can be read from the storage device 206 according to the control program executed by the CPU 207 and transmitted to the management apparatus 105 via the network I/F 202. In the present exemplary embodiment, the operational information includes counter value representing a cumulative number of printed sheets, operation log, status information, and failure information (e.g., error or alarm identification information, and generation time of the error or alarm).

The image forming apparatus 101 further includes a plurality of sensor units 218 provided at appropriate portions, for example, to measure apparatus inside temperature, moisture, drum surface temperature, and drum surface electric potential. The measurement values obtained by the sensor units 218 can be recorded in the storage device 206. Various measurement values recorded in the storage device 206 can be displayed on the operation unit 201 for a user when the image forming apparatus 101 is in a maintenance mode. Further, the operation unit 201 enables a user to change setting values relating to image formation (e.g., image reading position adjustment value, laser irradiation position, etc).

Figure 3:
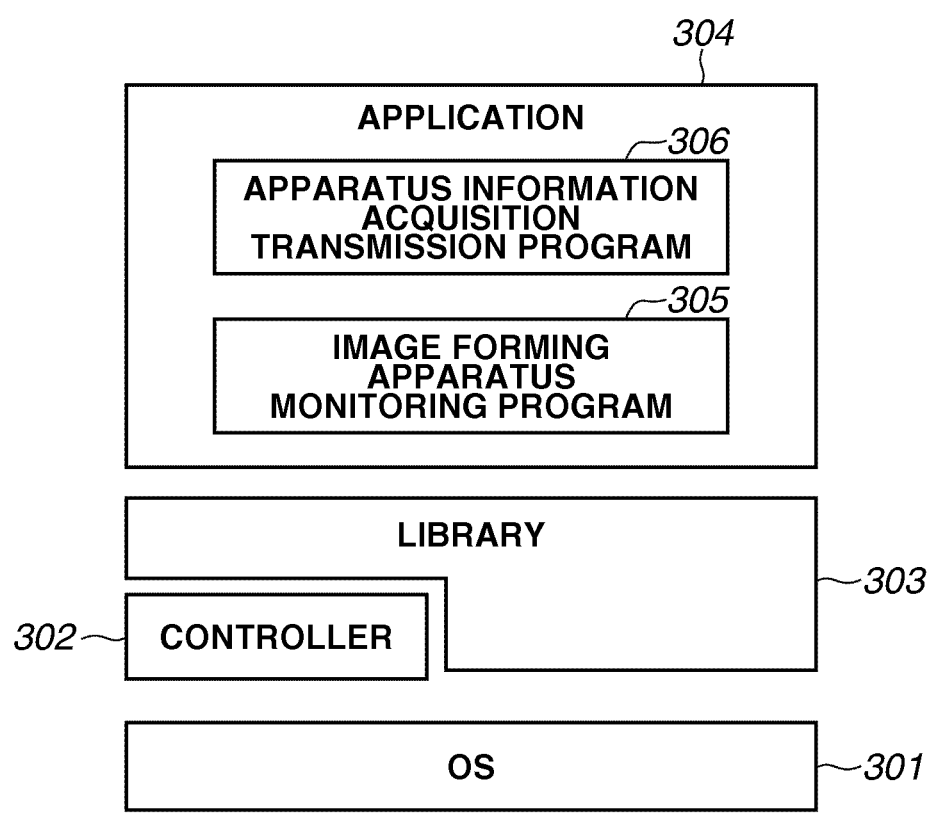
FIG. 3 is a block diagram illustrating an example of a software configuration of the image forming apparatus.

FIG. 3 is a block diagram illustrating an example of a software configuration of the image forming apparatus 101 according to a first exemplary embodiment of the present invention. The software illustrated in FIG. 3 is limited to the software relating to operations according to the present exemplary embodiment. However, the software configuration of the image forming apparatus 101 may include other programs that are not related to the operations according to the present exemplary embodiment. When the system is activated, the CPU 207 reads a system activation program (not illustrated) from the ROM 204 and starts its operation. The CPU 207 executes each program that can be loaded from the storage device 206 to the RAM 205.

The software configuration illustrated in FIG. 3 includes an operating system (OS) 301, a controller 302, a library 303, and an application 304.

The application 304 includes an image forming apparatus monitoring program 305 and an apparatus information acquisition transmission program 306.

The image forming apparatus monitoring program 305 acquires various types of operational information from the image forming apparatus via the controller 302, and controls transmission of the acquired operational information to the management apparatus 105. The image forming apparatus monitoring program 305 periodically acquires various information (e.g., firmware type, counter values (e.g., total number of printed sheets), and degree of wear of parts). Further, failure information (error, alarm, jam, etc), toner related information (toner low, toner empty, etc), and status information (e.g., door open) are occasionally transmitted, if occurs, to the management apparatus 105. It is needless to say that the information to be transmitted by the image forming apparatus monitoring program 305, periodically or when generated, is not limited to the above-described information.

The apparatus information acquisition transmission program 306 can be called by the image forming apparatus monitoring program 305 when an error is generated, to determine the necessity of acquisition and transmission of measurement values of various sensors (i.e., environmental information) at this moment and to perform the acquisition and transmission control. Further, when a service engineer operates the operation unit 201 to change various setting values relating to image formation, the apparatus information acquisition transmission program 306 acquires these setting values and controls transmission of these data to the management apparatus 105.

In addition, all of the above-described environmental information and setting values are transmitted to the management apparatus at the timing when the image forming apparatus is installed.

Figure 4:
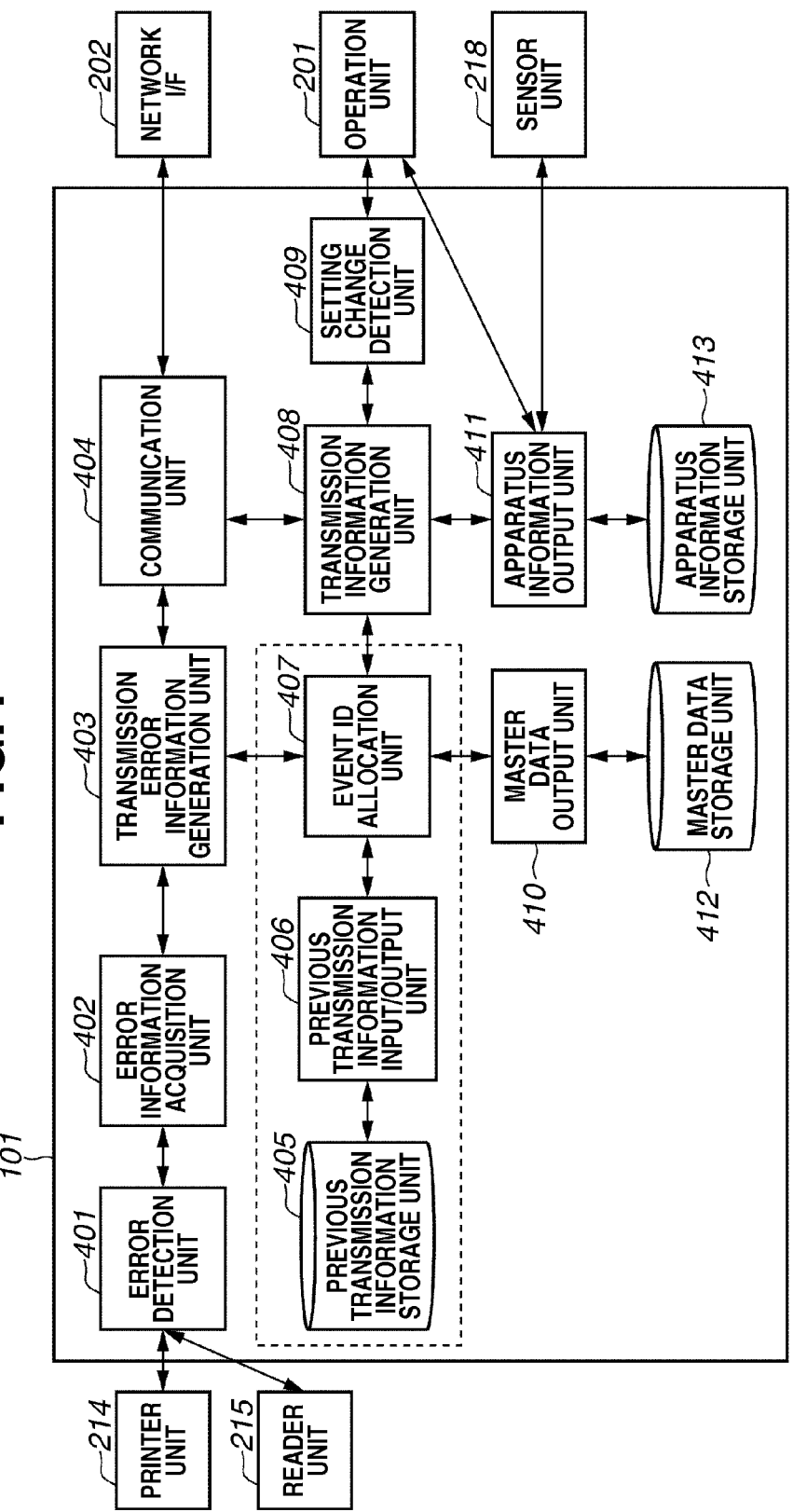
FIG. 4 is a block diagram illustrating an example of functional blocks that constitute the image forming apparatus.

FIG. 4 is a block diagram illustrating an example of functional blocks that can be realized by the image forming apparatus monitoring program 305 and the apparatus information acquisition transmission program 306 of the image forming apparatus 101 according to the first exemplary embodiment.

The apparatus information acquisition transmission program 306 causes an error detection unit 401 to detect errors that may be generated in the printer unit 214 and the reader unit 215. An error information acquisition unit 402 can acquire error information from the storage device 206. A transmission error information generation unit 403 can generate error information to be transmitted to the management apparatus 105 based on the acquired error information and an event ID designated by an event ID allocation unit 407. The error information generated by the transmission error information generation unit 403 can be stored in the storage device 206. A communication unit 404 can transmit event information (i.e., error information) stored in the storage device 206 to the management apparatus 105 via the network I/F 202.

The event ID allocation unit 407 can determine an event ID to be allocated to presently generated error information based on a presently generated error and previous event relevant information (including environmental information) received from a previous transmission information input/output unit 406. The previous transmission information input/output unit 406 can update the previous event relevant information stored in a previous transmission information storage unit 405 based on the event ID determined by the event ID allocation unit 407 and the presently generated error.

In the present exemplary embodiment, if the event ID allocation unit 407 is requested to allocate an event ID, the event ID allocation unit 407 acquires master data stored in a master data storage unit 412 via a master data output unit 410. Then, the event ID allocation unit 407 determines whether the presently generated error information indicates that the generated error requires environmental information. If it is determined that the generated error requires the environmental information, the event ID allocation unit 407 acquires a list of the environmental information to be acquired from the master data output unit 410. An identifier (hereinafter, referred to as "data ID") corresponding to each environmental information managed by the image forming apparatus 101 can be used to express the above-described environmental information list.

In the present exemplary embodiment, a transmission information generation unit 408 acquires, via an apparatus information output unit 411, the environmental information (i.e., measurement values relating to the printer unit 214 and the reader unit 215) stored in an apparatus information storage unit 413 with reference to the acquired environmental information list. Then, based on the acquired environmental information, the transmission information generation unit 408 generates event relevant information to be transmitted to the management apparatus 105. The transmission information generation unit 408 stores the generated event relevant information in the storage device 206. Then, the communication unit 404 transmits the environmental information stored in the storage device 206, via the network I/F 202, to the management apparatus 105.

A setting change detection unit 409 can detect a change of a setting value related to the image formation (image reading position adjustment value, laser irradiation position, etc) that is input via the operation unit 201. If a change of a specific setting value is detected, the transmission information generation unit 408 acquires the setting value related to the image formation from the apparatus information output unit 411 after a predetermined time (e.g., 60 minutes) has elapsed. Then, the transmission information generation unit 408 generates event relevant information based on the acquired setting value and the communication unit 404 transmits the generated event relevant information to the management apparatus 105.

FIG. 5 illustrates an example of a list including specific data ID and error codes to be transmitted, which are transmission targets with respect to the event relevant information corresponding to the environmental information or the setting values related to the image formation stored in the storage device 206 of the image forming apparatus 101. In the present invention, as described in the following exemplary embodiment, notification of an event and event relevant information are transmitted together for a specific event such as a change of a setting value related to image formation or generation of an error, among events that occur in the image forming apparatus.

The list illustrated in FIG. 5 includes a setting change data ID field 501, which can be used to specify setting changes that serve as transmission targets with respect to the event relevant information based on various setting values, includes a start value field 502 and an end value field 503 set for the data ID. The setting change data ID field 501 further includes a setting change details field 504. The list illustrated in FIG. 5 further includes an error code field 505, which store error codes serving as transmission targets with respect to the event relevant information base on environmental information, includes a start value field 506 and an end value field 507 for each error code to be transmitted. The error code field 505 further includes an error code details field 508.

The apparatus information acquisition transmission program 306 is called when setting is changed by a user or when an error is generated and determines whether transmission of accompanying event relevant information is necessary.

If there is any setting change, the apparatus information acquisition transmission program 306 checks whether the data ID relating to the present setting change is included in a range from the start value 502 to the end value 503. If it is determined that the present setting change is included in the range from the start value 502 to the end value 503, the apparatus information acquisition transmission program 306 determines that the transmission of accompanying event relevent information is necessary. Further, if an error is generated, the apparatus information acquisition transmission program 306 checks whether an error code of the generated error is included in the range from the start value 506 to the end value 507. If it is determined that the error code of the generated error is included in the range from the start value 506 to the end value 507, the apparatus information acquisition transmission program 306 determines that the transmission of accompanying event relevant information is necessary.

The setting relating to the above-described specific data ID and the error codes is not limited to the designation of a value range as described in the present exemplary embodiment. For example, it is useful to store a list including target codes. The data ID information and error codes can be stored separately in different lists.

FIG. 6 illustrates an example list 601 that stores the event relevant information which can be stored in the storage device 206 of the image forming apparatus 101 and transmitted to the management apparatus 105, according to the present exemplary embodiment.

The event relevant information (environmental information) in the list 601 can be transmitted to the management apparatus 105 when an error is generated. The list 601 includes a major item filed, a medium item field, a minor item field that are provided to hierarchically classify the event relevant information in the list 601. The list 601 further includes a detailed content field in which contents of the listed information is described, and a data ID field. The data ID is set for each data. The transmission information generation unit 408 can acquire environmental information from the storage device 206 with reference to the data ID.

FIG. 6 further illustrates an example list 602 that stores the event relevant information relating to various setting values to be transmitted to the management apparatus 105 when setting is changed. Similar to the above-described list 601, the list 602 includes a major item field, a medium item field, and a minor item field to hierarchically classify the event relevant information. The list 602 further includes a detailed content field in which the content of the event relevant information is described. In the present exemplary embodiment, unique data ID is set for each data.

FIG. 7 illustrates an example of information relating to an error that can be acquired by the error information acquisition unit 402, when an error is generated, in the present exemplary embodiment. In the present exemplary embodiment, the acquired information can be stored in the storage device 206.

Error relevant information 701 includes error generation date and time 702, a total counter value 703, and an error code 704. The total counter value 703 can be acquired from the storage device 206 when an error is generated.

FIG. 8 illustrates an example of information relating to the event relevant information having been transmitted together with a previously generated error, which is stored in the storage device 206 of the image forming apparatus 101, according to the first exemplary embodiment. The event relevant information illustrated in FIG. 8 does not include any environmental information that has been actually transmitted. It is useful to reduce a data storage area required for the image forming apparatus.

Information 801 relating to the previously transmitted event relevant information includes error generation date and time 802, an error code 803, and an event ID 804 of an error that has triggered the event relevant information. In the present embodiment, the event ID is identification information that can uniquely identify the event relevant information. Two or more pieces of event relevant information, which include similar environmental information, can be managed using the same event ID.

FIG. 9 illustrates an example of error information according to the first exemplary embodiment which can be generated by the transmission error information generation unit 403 when an error is generated and can be transmitted to the management apparatus 105. In the present exemplary embodiment, the generated error information is temporarily stored in the RAM 205.

The error information to be transmitted from the image forming apparatus 101 to the management apparatus 105 includes device ID 901 acquired from the storage device 206, error generation date and time 902, a total counter value 903 at error generation timing, and an error code 904. The error information to be transmitted from the image forming apparatus 101 to the management apparatus 105 further includes an event ID 905 to be associated with the event relevant information (including environmental information) that can be managed by the management apparatus 105. In the present exemplary embodiment, the error information acquisition unit 402 can generate each of the error generation date and time 902, the total counter value 903, and the error code 904, when an error is generated, based on the error related information stored in the storage device 206 (see FIG. 7). Then, the error generation date and time 902, the total counter value 903, and the error code 904 are stored in the storage device 206.

FIG. 10 illustrates an example of a list including event relevant information according to the present exemplary embodiment which can be generated by the transmission information generation unit 408 when an error is generated and can be transmitted to the management apparatus 105. In the present exemplary embodiment, the generated event relevant information can be temporarily stored in the RAM 205.

Event relevant information 1001 includes device ID 1002 acquired from the storage device 206, transmission date and time 1003, a total counter value 1004, an event ID 1005, and information relating to each value representing actual environmental information 1006. The environmental information includes data ID that indicates a type of each measurement value and a value of the data ID.

Further, in the present exemplary embodiment, the event ID 1005 does not include any setting information when the event relevant information is transmitted to the management apparatus 105 based on a setting change performed by a user. Therefore, for example, the management apparatus 105 can determine whether the event relevant information received from the image forming apparatus 101 is associated with error information or based on the setting change. Alternatively, it is useful to prepare and set a unique event ID that can identify event relevant information derived from the setting change.

Figure 11:
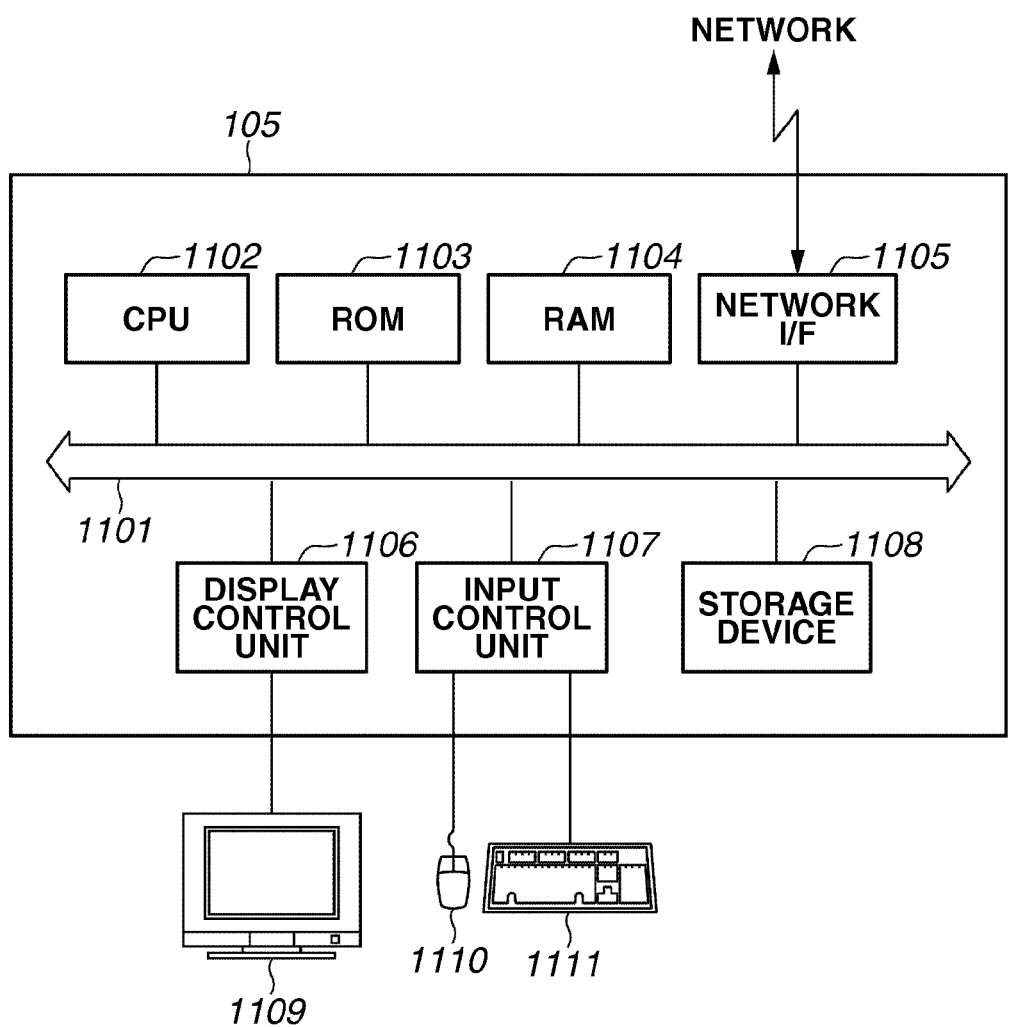
FIG. 11 is a block diagram illustrating an example of a hardware configuration of the management apparatus.

FIG. 11 is a block diagram illustrating an example of a hardware configuration of the management apparatus 105.

The management apparatus 105 can be constituted by a general computer. The management apparatus 105 includes a CPU 1102 that can control an entire operation to be performed by the management apparatus 105, a ROM 1103 that can serve as a read only memory for storing a boot program required to activate the system, and a RAM 1104 that can serve as a work memory when the CPU 1102 executes a program. The management apparatus 105 further includes a network I/F 1105 that can perform communications via the network, a display control unit 1106, an input control unit 1107, and a storage device 1108 that stores the programs to be executed by the CPU 1102 and operational information relating to the image forming apparatus.

The management apparatus 105 further includes a system bus 1101 via which the above-described constituent elements are mutually connected. The display control unit 1106 is connected to a display device 1109. The input control unit 1107 is connected to input devices 1110 and 1111. The above-described input/output devices enable an operator of the management apparatus 105 to confirm an operational state of the management apparatus 105 and input various operational instructions.

In the present exemplary embodiment, device information of the image forming apparatus that can be managed by the management apparatus 105 includes image forming apparatus identifier that can be used to identify the image forming apparatus (hereinafter, referred to as "device ID") and image forming apparatus fundamental information (a firmware type of the image forming apparatus, a model of the image forming apparatus, etc). The device information of the image forming apparatus further includes failure information (e.g., error, alarm, and jam) and parts wear rate information. The management apparatus 105 can manage each device ID in association with various types of information relating to the image forming apparatus (operational information, status information, etc) which are stored in the storage device 1108. Further, the management apparatus 105 stores an ID management table (not illustrated) that stores device ID information to be managed.

Further, in addition to the above-described information, the information relating to the image forming apparatus that can be managed by the management apparatus 105 includes environmental information (e.g., apparatus inside temperature and other measurement values) and various setting values (e.g., adjustment values related to image formation). The setting values related to the image formation include initial values (i.e., values at the timing when the image forming apparatus 101 is installed) and latest values (i.e., values that have been transmitted last) that are stored in the storage device 1108. The apparatus inside temperature and other measurement values include initial values (i.e., values at the timing when the image forming apparatus 101 is installed) and values that are received in a predetermined period of time which are stored in the storage device 1108.

Figure 12:
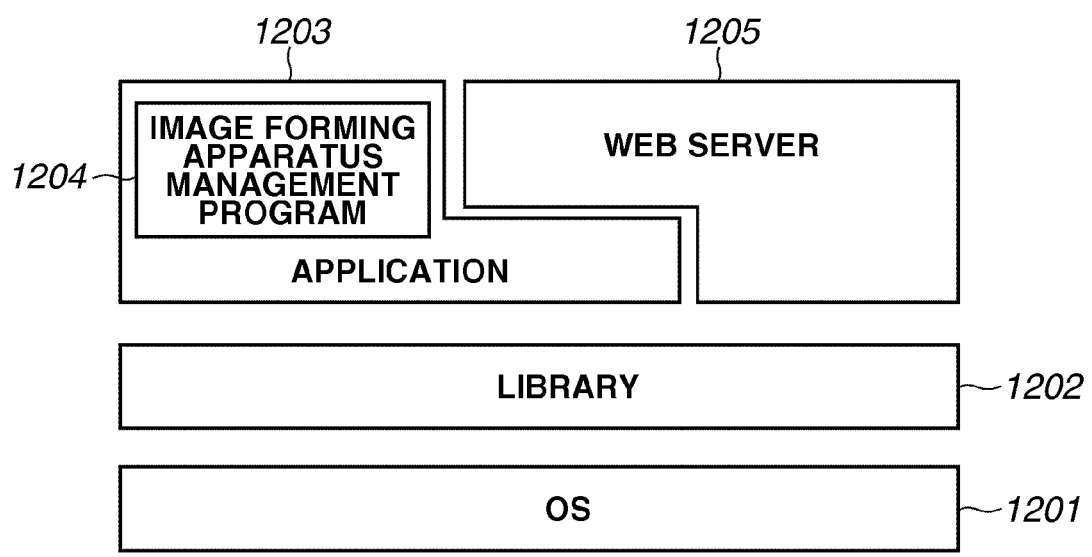
FIG. 12 is a block diagram illustrating an example of a software configuration of the management apparatus.

FIG. 12 is a block diagram illustrating an example of a software configuration of the management apparatus 105.

When the CPU 1102 activates the system, the CPU 1102 reads a system activation program (not illustrated) from the ROM 1103 and starts its operation. The CPU 1102 further executes each program loaded from the storage device 1108 to the RAM 1104. The software configuration illustrated in FIG. 12 further includes an operating system (OS) 1201 and a library 1202. An application 1203 includes an image forming apparatus management program 1204 that can be used to manage the image forming apparatuses 101 and 102 that are accessible via the Internet 104. A web server 1205 can perform message transmission/reception with the image forming apparatus 101 via the Internet 104.

Figure 13:
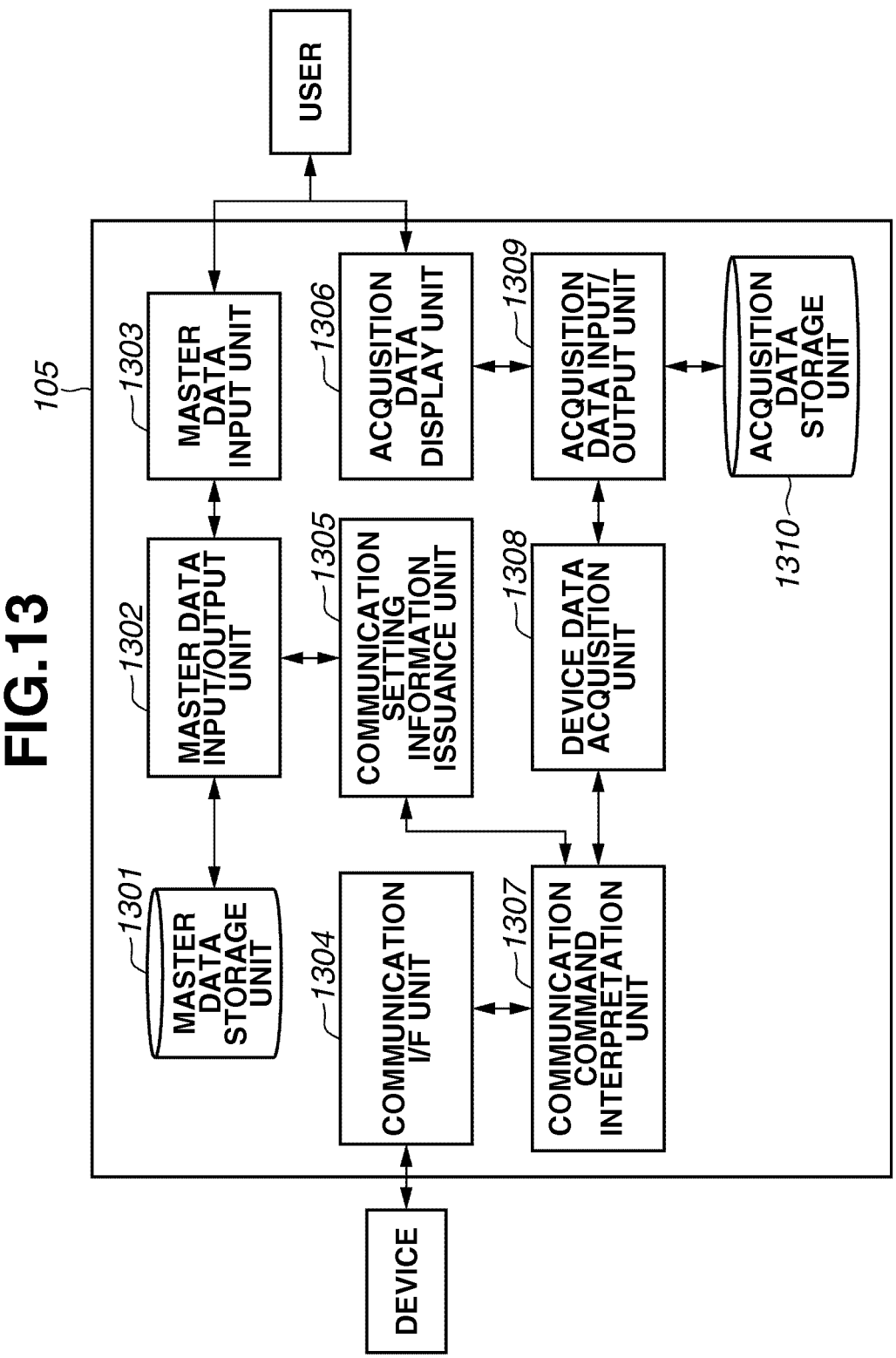
FIG. 13 is a block diagram illustrating an example of functional blocks that constitute the management apparatus.

FIG. 13 is a block diagram illustrating an example of functional units that constitute the management apparatus 105 according to the present exemplary embodiment. The functional blocks illustrated in FIG. 13 are related to functions realized by the image forming apparatus management program 1204 in the present exemplary embodiment.

The image forming apparatus management program 1204 (i.e., the management apparatus 105) includes a master data input unit 1303 that can receive master data input by a user. The master data includes two types of master data. One master data is model dependent device master data that indicates fundamental model information, such as a product name and product specifications of the image forming apparatus 101, or code information (e.g., error and alarm) which is dependent on the model of each image forming apparatus. The other master data is monitoring target device master data that indicates individual information of a monitoring target, such as device ID of a monitoring target image forming apparatus and client information (i.e., installation place). The image forming apparatus management program 1204 performs issuance of transmission settings based on input of the above-described two types of master data.

Further, the image forming apparatus management program 1204 includes a master data input/output unit 1302. The master data input/output unit 1302 performs processing for storing the input master data into a master data storage unit 1301.

Furthermore, the image forming apparatus management program 1204 includes a communication I/F unit 1304 that can communicate with the image forming apparatus monitoring program 305. The image forming apparatus management program 1204 further includes a communication command interpretation unit 1307 that can extract a command from data received from the image forming apparatus monitoring program 305 or can convert data into an appropriate communication format when the data is transmitted to the image forming apparatus monitoring program 305. The image forming apparatus management program 1204 further includes a communication setting information issuance unit 1305 that can determine whether to newly transmit transmission settings to the image forming apparatus monitoring program 305 or can determine appropriate transmission settings for the object image forming apparatus monitoring program 305 if a transmission schedule is request. The communication setting information issuance unit 1305 calls, from the master data input/output unit 1302, model dependent device master information and monitoring target device master information and determines the transmission settings appropriate for the image forming apparatus monitoring program 305.

The image forming apparatus management program 1204 further includes a device data acquisition unit 1308 that receives, from the communication command interpretation unit 1307, status information that has been received in a normal monitoring state from the image forming apparatus monitoring program 305. The image forming apparatus management program 1204 further includes an acquisition data storage unit 1310 that stores information acquired by the device data acquisition unit 1308 and an acquisition data input/output unit 1309 that can manage processing for inputting and outputting the information to and from the acquisition data storage unit 1310. Moreover, the image forming apparatus management program 1204 further includes an acquisition data display unit 1306 that can display the status information acquired from a device for the user.

FIG. 14 illustrates an example of error history information relating to the image forming apparatus 101 which can be managed by the management apparatus 105 in the first exemplary embodiment. In the present exemplary embodiment, the error history of the image forming apparatus 101 (device ID: DEV00001) illustrated in FIG. 14 is, for example, stored in the storage device 1108.

An error history table 1401, which indicates the history of each error transmitted from the image forming apparatus 101 to the management apparatus 105, includes an error generation date and time field, a total counter field, and an error code field. A numerical value described in the total counter field indicates a counter value at the timing when an error is generated. The error history table 1401 further includes an event ID field. In the present exemplary embodiment, the event ID field stores no data when a generated error is not a target to which event relevant information including environmental information is transmitted.

FIG. 15 illustrates a management table including image formation setting values relating to the image forming apparatus 101 which can be managed by the management apparatus 105 in the present exemplary embodiment. In the present exemplary embodiment, the information relating to the image forming apparatus 101 (device ID: DEV00001) is indicated in the table and, for example, stored in the storage device 1108.

The management table illustrated in FIG. 15 includes an image formation relevant setting value field 1501 that stores setting values included in the event relevant information received from the image forming apparatus 101. Each setting value is defined by an initial value (i.e., a value at the timing when the image forming apparatus 101 is installed) and a latest value. The management table illustrated in FIG. 15 further includes identification information (minor item) and its content to be managed for various setting values.

FIG. 16 illustrates a management table including environmental information relating to the image forming apparatus 101 which can be managed by the management apparatus 105 in the present exemplary embodiment. In the present exemplary embodiment, the information relating to the image forming apparatus 101 (device ID: DEV00001) is indicated in the table and, for example, stored in the storage device 1108.

The management table illustrated in FIG. 16 includes a link ID field 1601 that stores an event ID to be associated with error information and an environmental information field 1602 that stores environmental information corresponding to the event ID stored in the link ID field 1601, which is included in the event relevant information received from the image forming apparatus 101. In the present exemplary embodiment, the environmental information is data stored during a predetermined period of time (e.g., latest six months). The management table illustrated in FIG. 16 further includes identification information and its content to be managed for various types of environmental information.

Figure 17:
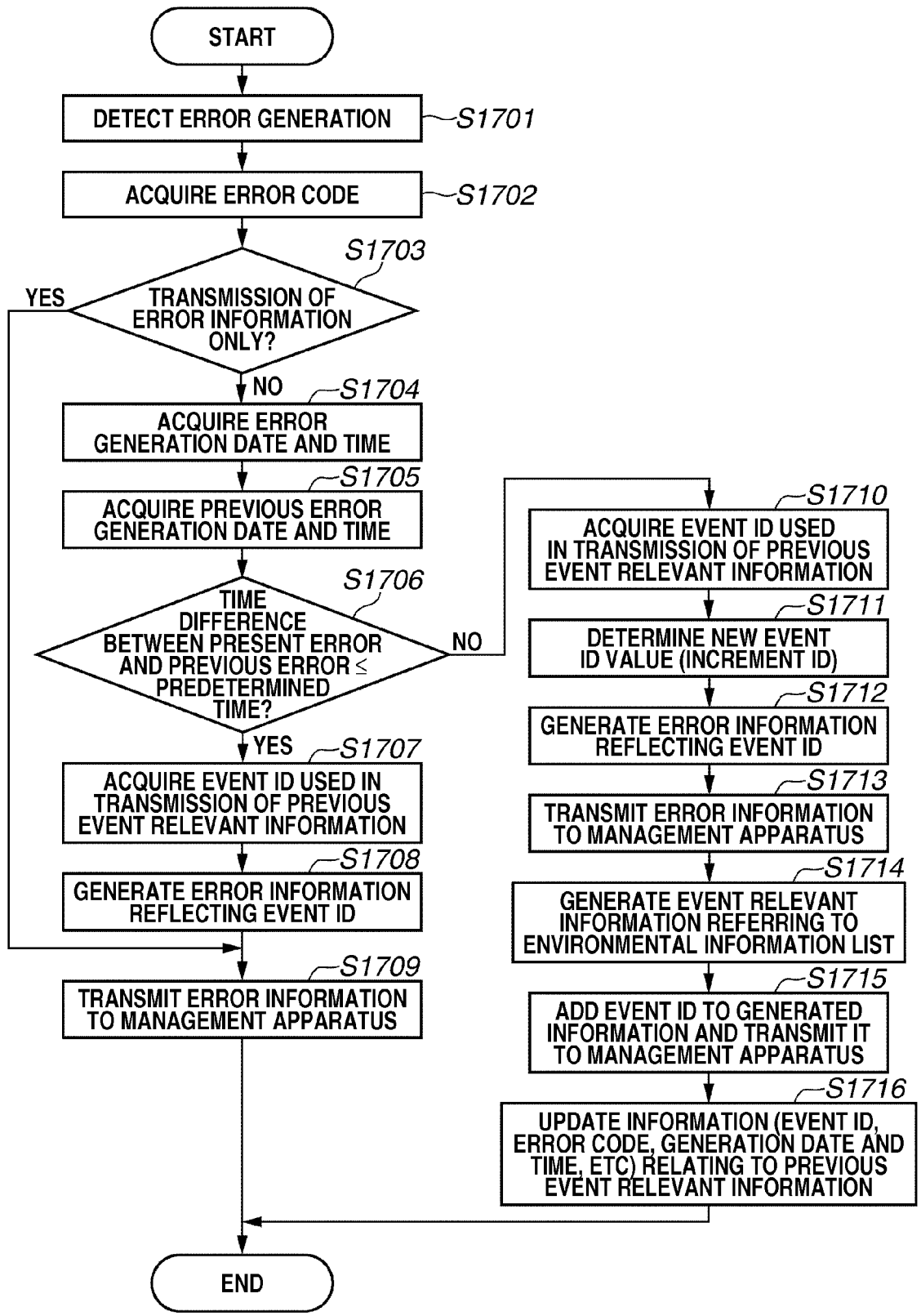
FIG. 17 is a flowchart illustrating an example of processing that can be performed by the image forming apparatus, when an error is generated, according to a first exemplary embodiment of the present invention.

FIG. 17 is a flowchart illustrating an example of processing that can be performed by the image forming apparatus 101 according to the above-described program, when an error is generated, in the present exemplary embodiment.

In step S1701, the error detection unit 401 detects an error if it is generated. In step S1702, the error information acquisition unit 402 acquires error information (see FIG. 7) and stores the acquired error information as information relating to the presently generated error in the RAM 205.

In step S1703, the image forming apparatus 101 determines whether the presently generated error is an error that requires transmission of the error information only. In other words, the image forming apparatus 101 determines whether the presently generated error stored in the RAM 205 in step S1702 requires transmission of the event relevant information (e.g., environmental information) together with the error information, with reference to the list of specific error codes stored in the storage device 206. If it is determined that the presently generated error requires transmission of the event relevant information together with the error information (NO in step S1703), the processing proceeds to step S1704. If it is determined that the presently generated error does not require any transmission of the event relevant information together with the error information (YES in step S1703), the processing proceeds to step S1709. According to the example illustrated in FIG. 7, the processing proceeds to step S1704.

In step S1704, the image forming apparatus 101 acquires generation date and time information relating to the presently generated error stored in the RAM 205 in step S1702. In step S1705, the image forming apparatus 101 acquires generation date and time information relating to a previous error with reference to the information (see FIG. 8) relating to the previous event relevant information which is stored in the storage device 206.

In step S1706, the image forming apparatus 101 compares the error generation date and time information acquired in step S1704 with the error generation date and time information acquired in step S1705. The image forming apparatus 101 determines whether the occurrence of the present error is within a predetermined period of time from the generation timing of the previous error. In the present exemplary embodiment, the predetermined period of time can be set to, for example, one minute. If it is determined that the occurrence of the present error is within the predetermined period of time (YES in step S1706), the processing proceeds to step S1707. If it is determined that the occurrence of the present error is not within the predetermined period of time (NO in step S1706), the processing proceeds to step S1710. According to the examples illustrated in FIGS. 7 and 8, the occurrence of the present error is within one minute. Therefore, the processing proceeds to step S1707.

In step S1707, the image forming apparatus 101 acquires an event ID with reference to the information (see FIG. 8) relating to the previous event relevant information which is stored in the storage device 206. In step S1708, the image forming apparatus 101 generates error information (see FIG. 9) to be transmitted to the management apparatus 105 based on the presently generated error information which is stored in the RAM 205 in step S1702. The image forming apparatus 101 stores an event ID value that is identical to the event ID value set for the previous event relevant information acquired in step S1707.

In step S1709, the image forming apparatus 101 transmits the error information to the management apparatus 105 via the network I/F 202.

On the other hand, when it is determined that the occurrence of the present error is not within the predetermined period of time (NO in step S1706), the processing proceeds to step S1710.

In step S1710, the image forming apparatus 101 acquires the event ID with reference to the information (see FIG. 8) relating to the previous event relevant information stored in the storage device 206. In step S1711, the image forming apparatus 101 determines a new ID value based on the event ID acquired in step S1710. In the present exemplary embodiment, the image forming apparatus 101 increments the ID value by one. In step S1712, similar to step S1708, the image forming apparatus 101 generates error information (see FIG. 9) to be transmitted to the management apparatus 105 based on the presently generated error information which is stored in the RAM 205 in step S1702. The image forming apparatus 101 stores an event ID value that is identical to the event ID value determined in step S1711. In step S1713, the image forming apparatus 101 transmits the error information generated in step S1712 to the management apparatus 105.

In step S1714, the apparatus information output unit 411 acquires the required information (i.e., the environmental information in the present exemplary embodiment) with reference to the information to be transmitted to the management apparatus 105 (see FIG. 6) which is stored in the storage device 206. The image forming apparatus 101 stores the acquired information in the RAM 205. Then, the image forming apparatus 101 generates event relevant information based on the acquired information. In step S1715, the image forming apparatus 101 adds the event ID determined in step S1711 to the event relevant information generated in step S1714, and transmits the event relevant information with the added event ID to the management apparatus 105 via the network I/F 202.

In step S1716, the image forming apparatus 101 updates the information (see FIG. 8) relating to the previous event relevant information which is stored in the storage device 206. The image forming apparatus 101 stores an event ID value that is identical to the event ID value determined in step S1711 and stores error generation date and time information and error code data that are identical to the presently generated error information stored in the RAM 205 in step S1702.

In the above-described exemplary embodiment, the image forming apparatus 101 sets the same event ID for a plurality of errors if these errors have occurred in the predetermined period of time (e.g., one minute). However it is not necessarily to use the same event ID. For example, the image forming apparatus 101 can compare the total count value in the total counter 703 at the timing when the previous error is generated and one at the timing when the present error is generated. If there is no difference between the compared counter values or if the difference is within a predetermined value (e.g., a designated number of sheets), the image forming apparatus 101 can allocate the same event ID to the previous error and the present error.

Figure 18:
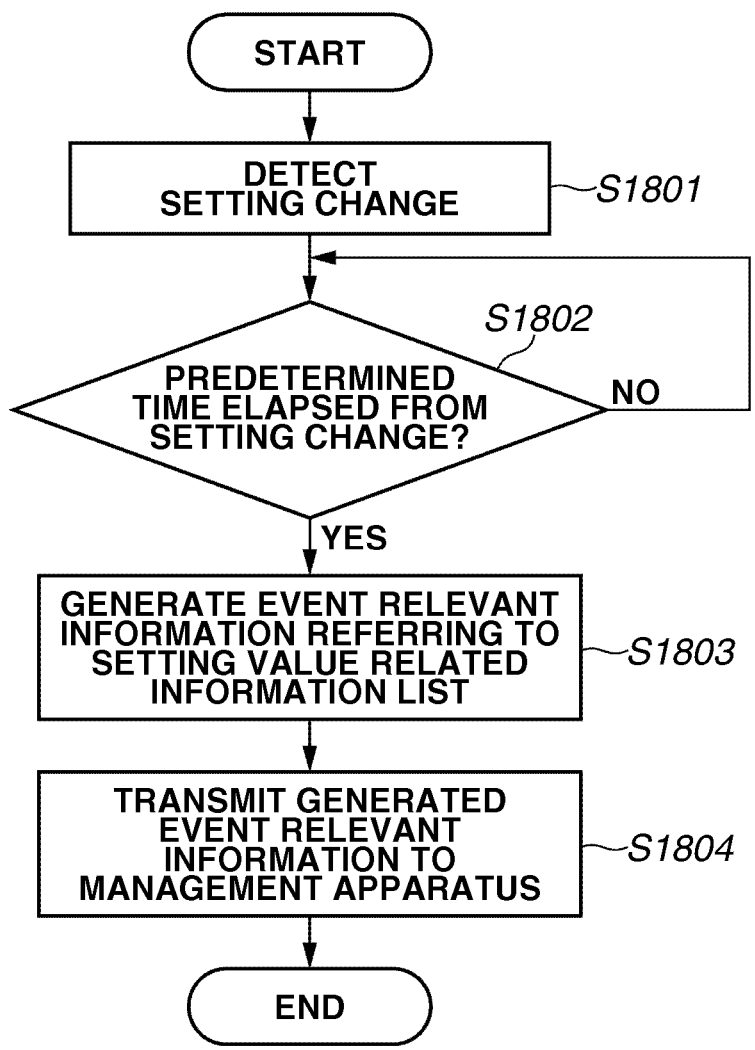
FIG. 18 is a flowchart illustrating an example of processing that can be performed by the image forming apparatus, when setting is changed, according to the first exemplary embodiment.

FIG. 18 is a flowchart illustrating an example of processing that can be performed by the image forming apparatus 101 according to the above-described program, when a setting relating to the image formation is changed, in the present exemplary embodiment.

In step S1801, the setting change detection unit 409 detects a change of a setting value in the image forming apparatus 101.

In step S1802, the image forming apparatus 101 checks whether a predetermined period of time has elapsed after the time when the setting change has been detected in step S1801. In the present exemplary embodiment, the predetermined period of time may be, for example, set to 60 minutes. If it is determined that the predetermined period of time has elapsed (YES in step S1802), the processing proceeds to step S1803. If it is determined that the predetermined period of time has not yet elapsed (NO in step S1802), the image forming apparatus 101 repeats the processing to be performed in step S1802.

In step S1803, the apparatus information output unit 411 acquires the required information (i.e., the information relating to setting values in the present exemplary embodiment) with reference to the information to be transmitted to the management apparatus 105 (see FIG. 6) which is stored in the storage device 206. The image forming apparatus 101 stores the acquired information in the RAM 205. Then, image forming apparatus 101 generates the event relevant information to be transmitted to the management apparatus 105 based on the information stored in the RAM 205. In step S1804, the image forming apparatus 101 transmits the generated event relevant information to the management apparatus 105 via the network I/F 202. In the present exemplary embodiment, no event ID is set for event relevant information if it is derived from a setting change. This is useful to discriminate the event relevant information derived from the setting change from the above-described event relevant information (e.g., environmental information) to be generated when an error is generated. However, an event ID can be allocated if it is necessary to indicate that event relevant information is derived from the setting change.

Figure 19:
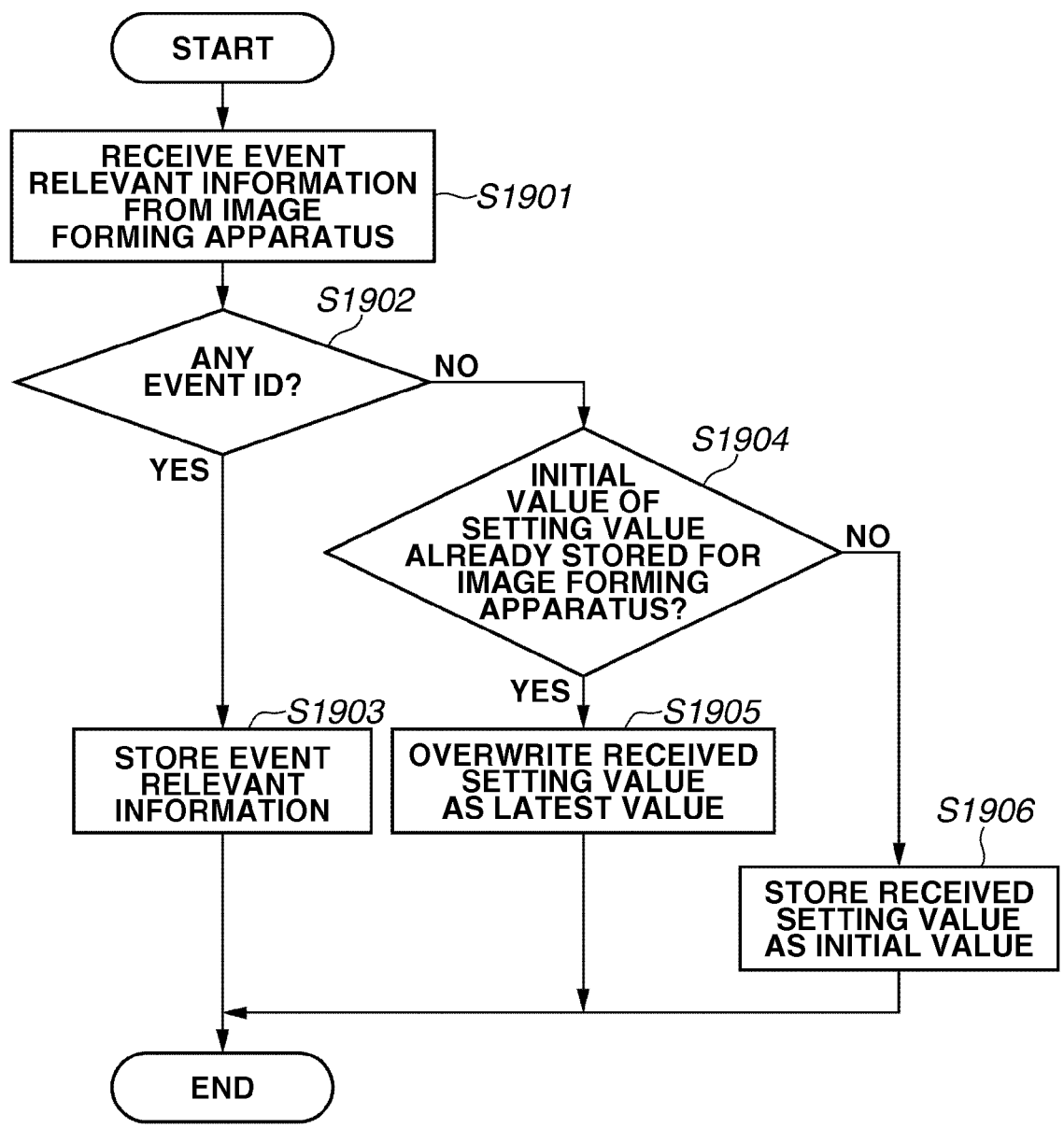
FIG. 19 is a flowchart illustrating an example of processing that can be performed by the management apparatus, when event relevant information is received, according to the first exemplary embodiment.

FIG. 19 is a flowchart illustrating an example of processing that can be performed by the management apparatus 105 based on the above-described program, when event relevant information is received from the image forming apparatus 101, according to the present exemplary embodiment.

In step S1901, the management apparatus 105 receives the event relevant information from the image forming apparatus 101 via the network I/F 1105. The management apparatus 105 stores the received event relevant information in the RAM 1104.

In step S1902, the management apparatus 105 checks whether the received event relevant information includes any event ID with reference to the event relevant information stored in the RAM 1104 in step S1901. If it is determined that the received event relevant information includes an event ID (YES in step S1902), the management apparatus 105 determines that the received event relevant information is environmental information transmitted in response to generation of an error. Then, the processing proceeds to step S1903. If it is determined that the received event relevant information does not include any event ID (NO in step S1902), the management apparatus 105 determines that the received event relevant information is setting value related information transmitted in response to a setting change. Then, the processing proceeds to step S1904.

In step S1903, the management apparatus 105 stores the event relevant information (i.e., environmental information) stored in the RAM 1104 in step S1901 to the storage device 1108. In the present exemplary embodiment, the management apparatus 105 manages the received environmental information in association with the device ID of the image forming apparatus.

In step S1904, the management apparatus 105 checks whether initial values of the setting values for the image forming apparatus 101 are already stored in the storage device 1108. If it is determined that the initial values of the setting values are already stored in the storage device 1108 (YES in step S1904), the processing proceeds to step S1905. If it is determined that the initial values of the setting values are not stored in the storage device 1108 (NO in step S1904), the processing proceeds to step S1906. In step S1905, the management apparatus 105 stores the information (i.e., various setting values) stored in the RAM 1104 in step S1901 as latest values in the storage device 1108. In step S1906, the management apparatus 105 stores the information (i.e., various setting values) stored in the RAM 1104 in step S1901 as initial values in the storage device 1108.

Figure 20:
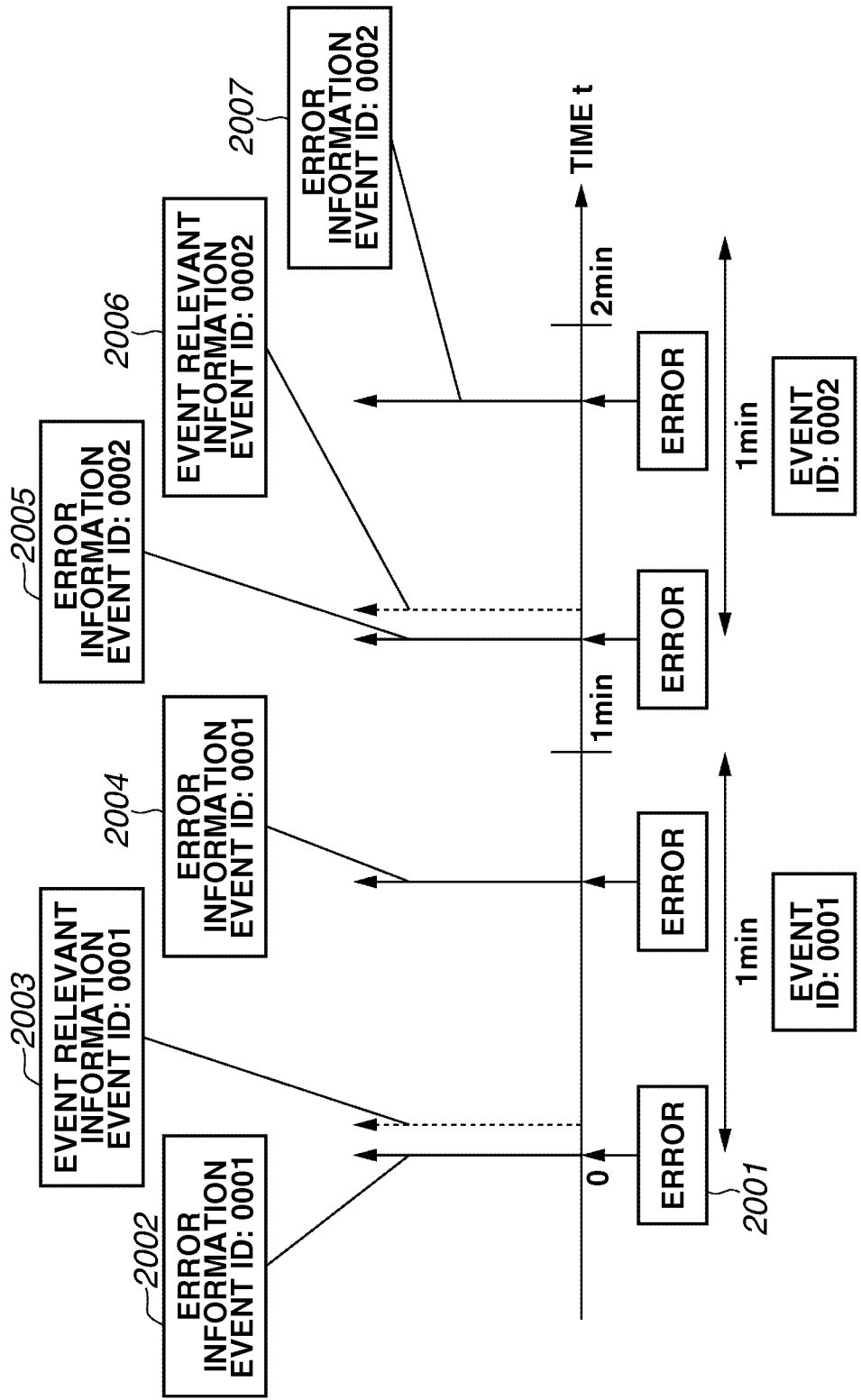
FIG. 20 illustrates an example of event relevant information transmitted from the image forming apparatus to the management apparatus.

FIG. 20 illustrates an example of event relevant information transmitted from the image forming apparatus 101 to the management apparatus 105.

The first error is generated at timing 2001. The image forming apparatus 101 transmits error information 2002, 2004, 2005, and 2007 (see FIG. 9) and event relevant information 2003 and 2006 (see FIG. 10) to the management apparatus 105.

In the present exemplary embodiment, the generation time of error 2001 is t=0. The image forming apparatus 101 sets event ID (0001) for the error information 2002 and transmits the error information 2002 to the management apparatus 105. The image forming apparatus 101 further sets the same event ID (0001) for the event relevant information 2003 that includes environmental information acquired when the error is generated and transmits the event relevant information 2003 to the management apparatus 105. Then, if the next error is generated within a period of one minute after the timing when the error 2001 has been generated, the image forming apparatus 101 sets the same event ID (0001) for the error information 2004 and transmits the error information 2004 to the management apparatus 105. In this case, the image forming apparatus 101 does not perform the processing for generating and transmitting accompanying event relevant information. The image forming apparatus 101 performs similar processing for the error information 2003 and 2007 as well as for the event relevant information 2006.

According to the above-described exemplary embodiment, when an error is generated within the predetermined time after generation of a previous error, the image forming apparatus 101 sets the same event ID for these errors. Consequently, the management apparatus 105 can refer to the same event relevant information having been already received from the image forming apparatus 101. Therefore, the above-described exemplary embodiment can reduce an amount of data to be transmitted from the image forming apparatus 101 to the management apparatus 105 in managing the information required in the maintenance of the management apparatus.

Further, in the present exemplary embodiment, the management apparatus 105 displays the information relating to the image forming apparatus 101 stored in the storage device 1108, for example, on a web site, as described below in more detail with reference to FIGS. 21 to 24.

The above-described display enables a user to obtain information required in the maintenance of the image forming apparatus. Further, based on the information obtained from the web site, the user can determine whether to perform a maintenance work at the installation place of the image forming apparatus 101 or perform a maintenance work at a remote place (change of setting values, transmission of various commands, etc). When the maintenance work is performed from the remote place, the user can perform control for transmitting commands via the web site or directly from the management apparatus 105. In this case, for example, setting information for executing these commands or the commands themselves can be transmitted in response to an access from the image forming apparatus (i.e., the maintenance target). To perform the above-described remote maintenance operation, it is desired to provide an environment in which a sufficient capacity of a communication path is secured to obtain a sufficient amount of environmental information according to the present exemplary embodiment and to prevent the processing according to the present exemplary embodiment from being interrupted during the maintenance operation.

Figure 21:
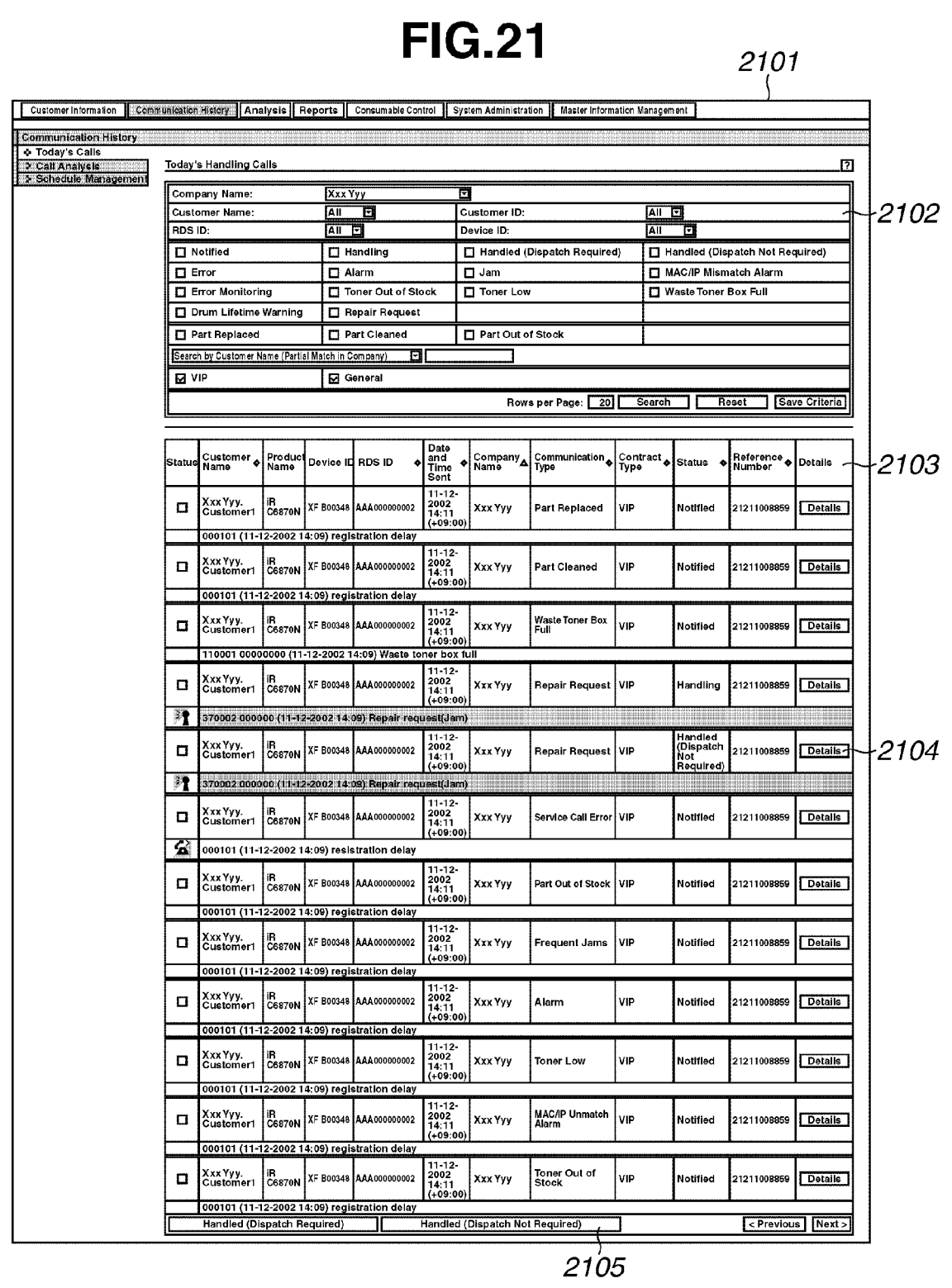

FIG. 21 illustrates an example of screen display relating to an error history of the image forming apparatus 101 which can be provided by the management apparatus 105.

An error history display screen 2101, which can be provided by the management apparatus 105 displays error history information of the image forming apparatus 101. The error history display screen 2101 includes a search conditions field 2102, an error history field 2103, and buttons 2104. The search conditions field 2102 enables a user to set various conditions (client name, error content, etc) to search an error in the image forming apparatus 101. The error history field 2103 displays an error history which includes various error information, such as a product name, a device ID, and error generation date and time, which is stored in the storage device 1108. Each button 2104 can be pressed to display detailed error information. If the button 2104 is pressed, the screen display shifts to an error details display screen illustrated in FIG. 22. An operator can press a button 2105 to display information (not illustrated) required to confirm and change the status of a service engineer dispatched for the error.

Figure 22:
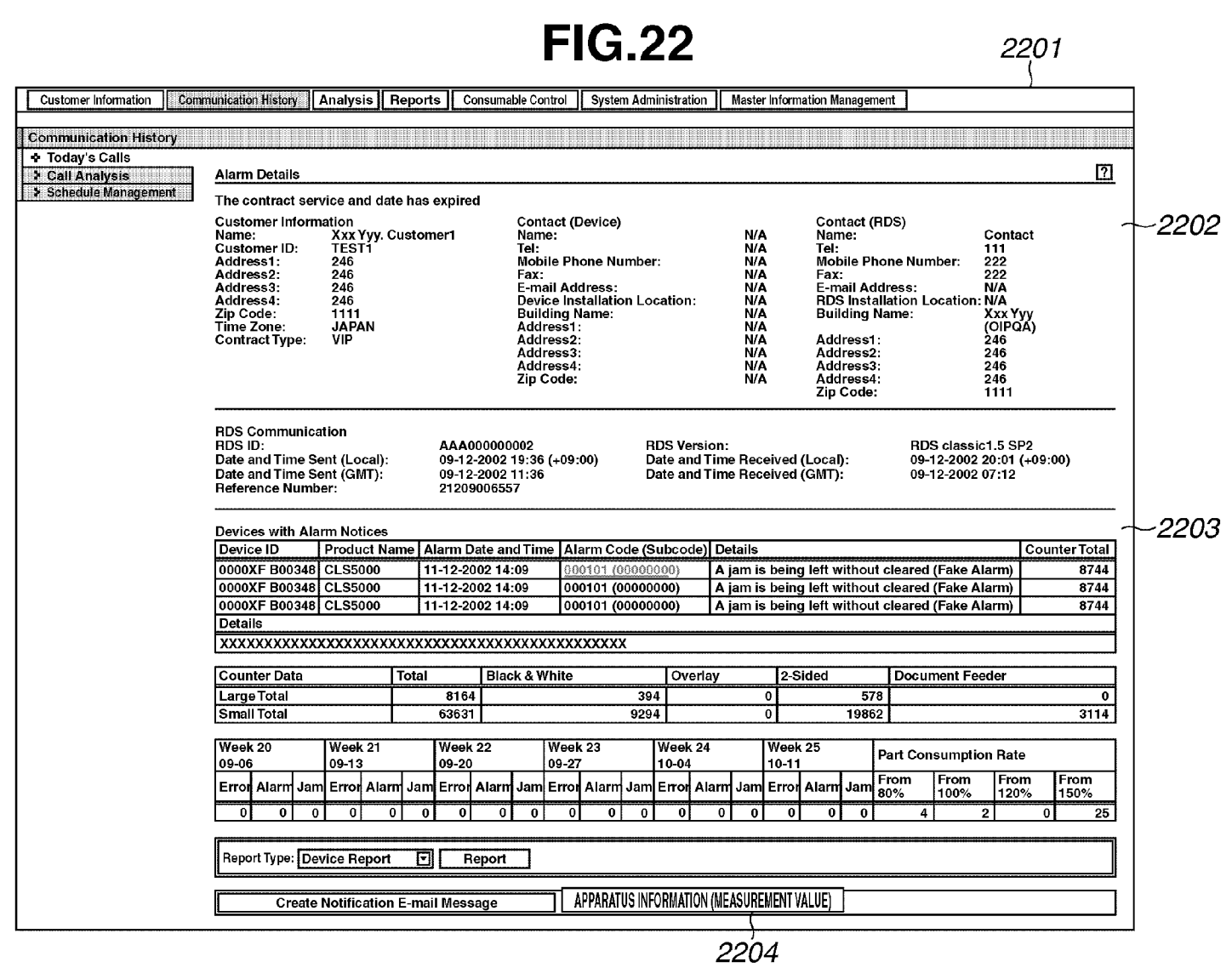

FIG. 22 illustrates an example of the screen display relating to the detailed error information of the image forming apparatus 101 which can be provided by the management apparatus 105 according to the first exemplary embodiment.

An error details display screen 2201 which can be provided by the management apparatus 105 displays detailed error information of the image forming apparatus 101. The error details display screen 2201 includes a storage information (e.g., device ID) field 2202, a details field 2203, and a button 2204. The storage information field 2202 displays information stored in the storage device 1108, such as client information and information relating to the image forming apparatus 101. The details field 2203 indicates details of the error corresponding to the pressed button 2104, such as alarm and a counter value of the image forming apparatus 101, which is stored in the storage device 1108. When the button 2204 is pressed, the management apparatus 105 displays environmental information of the image forming apparatus 101 which is stored in the storage device 1108 in association with the event ID of the error corresponding to the button 2104. When the button 2204 is pressed, the screen display shifts to an environmental information display screen (see FIG. 23).

FIG. 23 illustrates an example of screen display relating to environmental information relating to the image forming apparatus 101 which can be provided by the management apparatus 105 according to the present exemplary embodiment.

An environmental information display screen 2301 which can be provided by the management apparatus 105 displays the environmental information of the image forming apparatus 101. The environmental information display screen 2301 includes a storage information field 2302, a button 2303, and an environmental information field 2304. The storage information field 2302 displays information stored in the storage device 1108, such as client information and information (e.g., device ID) relating to the image forming apparatus 101. If the button 2303 is pressed, the management apparatus 105 displays setting values for the image forming apparatus 101. When the button 2303 is pressed, the screen display shifts to a setting values display screen (see FIG. 24) for the image formation. The environmental information field 2304 displays the environmental information (various measurement values) of the image forming apparatus 101 which is stored in the storage device 1108 in association with the event ID of the error corresponding to the pressed button 2104.

FIG. 24 illustrates an example of screen display relating to setting values for the image forming apparatus 101 which can be provided by the management apparatus 105 according to the present exemplary embodiment.

A setting values display screen 2401 which can be provided by the management apparatus 105 displays various setting values for the image forming apparatus 101. The setting values display screen 2401 includes a storage information field 2402, a button 2403, and a various setting values field 2404. The storage information field 2402 displays information stored in the storage device 1108, such as the client information and the information (e.g., device ID) relating to the image forming apparatus 101. If the button 2403 is pressed, the management apparatus 105 displays environmental information (e.g., measurement values obtained by various sensors provided in the image forming apparatus). When the button 2403 is pressed, the screen display shifts to the environmental information display screen (see FIG. 23). The various setting values field 2404 displays various setting values of the image forming apparatus 101 which are stored in the storage device 1108 in association with the event ID of the error corresponding to the pressed button 2104.

As illustrated in FIGS. 23 and 24, the management apparatus 105 provides appropriate screens that enables a user to confirm the environmental information and a plurality of setting values for the image formation while associating them with each other.

The environmental information to be referred to when an error is generated may be different according to the type of each error. Accordingly, the event relevant information to be transmitted to the management apparatus 105 may be changed according to the type of each error. An example of processing to be performed in such a case by the image forming apparatus 101 when an error is generated is described below.

FIG. 25 illustrates an example of a list including specific data ID information and error codes which serve as transmission targets with respect to the event relevant information based on the environmental information stored in the storage device 206 of the image forming apparatus 101 and the setting values related to the image formation, according to a second exemplary embodiment of the present invention. The list illustrated in FIG. 25 includes a list number of information to be transmitted together with the corresponding data ID and error code.

The list illustrated in FIG. 25 includes a setting change data ID field 2501 that stores setting change relevant to the data ID that serves as the transmission target with respect to the event relevant information based on various setting values. The setting change data ID field 2501 stores a start value and an end value set for the data ID and the list number set in association with the information to be transmitted when a setting change satisfying the conditions set for the data ID is performed.

The list illustrated in FIG. 25 further includes an error code filed 2502 that stores error codes serving as the transmission target with respect to the event relevant information based on the environmental information. Similar to the setting change data ID field 2501, the error code filed 2502 stores a start value and an end value set for the error code as well as a corresponding list number set for the error code.

FIG. 26 illustrates an example of lists including various types of information to be transmitted to the management apparatus 105 which are stored in the storage device 206 of the image forming apparatus 101 according to the present exemplary embodiment.

The lists illustrated in FIG. 26 include a notification content list 2601 and a notification content list 2602 which store the event relevant information based on the environmental information to be transmitted to the management apparatus 105 when an error is generated. A list number 500 is allocated for the notification content list 2601. A list number 600 is allocated for the notification content list 2602. The event relevant information in each list is defined according to a hierarchical classification including a major item, a medium item, and a minor item. Each list further stores detailed contents of each data, to which a unique data ID is set. The transmission information generation unit 408 can acquire the event relevant information stored in the storage device 206 referring to the data ID.

A notification content list 2603 illustrated in FIG. 26 stores the event relevant information to be transmitted to the management apparatus 105 when setting is changed. A list number 100 is allocated for the notification content list 2603.

In the present exemplary embodiment, an error code 704 is generated as illustrated in FIG. 7. In this case, by referring to the error code filed 2502, it is understood that the list number is 600. Then, the environmental information can be acquired from the list and the event relevant information can be generated based on the acquired environmental information. The generated event relevant information can be transmitted to the management apparatus 105.

FIG. 27 illustrates an example of information relating to the event relevant information corresponding to a previously generated error which is stored in the storage device 206 of the image forming apparatus 101 according to the present exemplary embodiment.

Event relevant information 2701 corresponding to the previously generated error includes a list number, error generation date and time information of an error having triggered the previous transmission, an error code, a total counter value at the timing when an error is generated, and an event ID.

Figure 28:
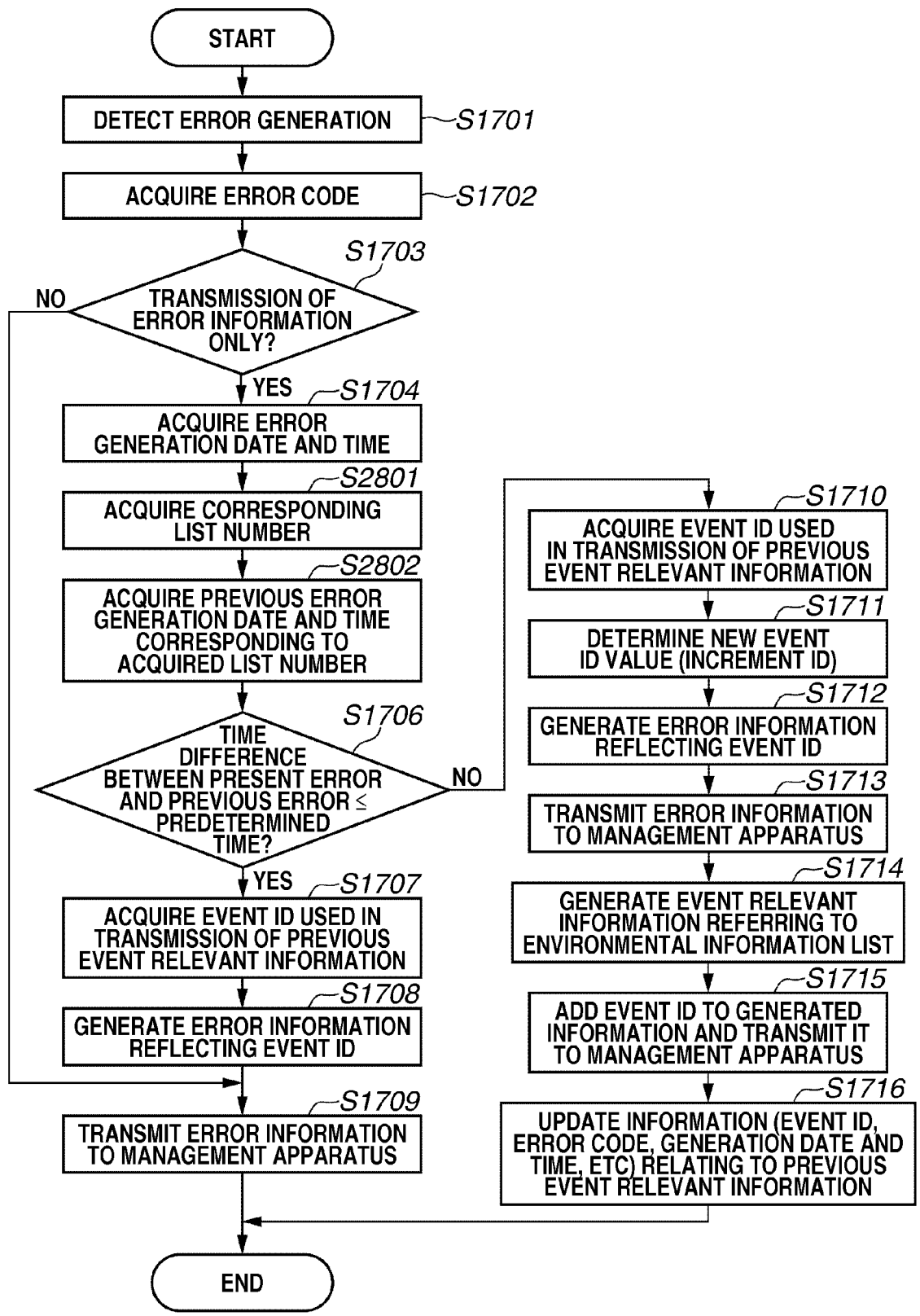
FIG. 28 is a flowchart illustrating an example of processing that can be performed by the image forming apparatus, when an error is generated, according to the second exemplary embodiment.

FIG. 28 is a flowchart illustrating an example of processing that can be performed by the image forming apparatus 101 according to the above-described program, when an error is generated, in the present exemplary embodiment. The following description of processing according to the present exemplary embodiment is limited to a part that is different from the processing described in the first exemplary embodiment with reference to FIG. 17.

In step S1704, the image forming apparatus 101 acquires generation date and time information relating to the presently generated error stored in the RAM 205. In step S2801, the image forming apparatus 101 acquires a list number that can identify the environmental information to be acquired with reference to the specific error code list (see FIG. 25) stored in the storage device 206. The image forming apparatus 101 stores the acquired list number in the RAM 205.

In step S2802, the image forming apparatus 101 acquires the list number stored in the RAM 205 in step S2801. The image forming apparatus 101 acquires information relating to the event relevant information (see FIG. 27) corresponding to the previously generated error which is stored in the storage device 206. Then, the image forming apparatus 101 acquires previous error generation time with reference to the data corresponding to the list number acquired from the RAM 205.

Subsequently, similar to the first exemplary embodiment, if a predetermined period of time (e.g., one minute) has elapsed from the generation timing of the previous error, the image forming apparatus 101 determines a new event ID and acquires the environmental information with reference to the information illustrated in FIG. 26. Then, the image forming apparatus 101 performs transmission of the event relevant information based on the acquired environmental information. If the predetermined period of time has not yet elapsed from the generation timing of the previous error, the image forming apparatus 101 sets the same event ID that was set for the previous transmission. In this case, the image forming apparatus 101 transmits only the error information to the management apparatus 105.

As described above in the present exemplary embodiment, the image forming apparatus 101 can change the information to be transmitted to the management apparatus 105 according to a generated error or the type of a setting change. Therefore, the image forming apparatus 101 can reduce the amount of information to be transmitted to the management apparatus 105.

In the present exemplary embodiment, only one list number is allocated to each error in the list (see FIG. 26) storing the event relevant information to be transmitted to the management apparatus 105. However, if it is desired, a plurality of list numbers can be set for each error.

The above-described second exemplary embodiment prepares the list number so that the information to be transmitted to the management apparatus 105 can be identified according to the type of each error. The image forming apparatus 101 stores information relating to the previous event relevant information corresponding to each list number (see FIG. 27). However, the same event ID can be set for all list numbers as described in a third exemplary embodiment of the present invention.

An example of processing that can be performed in such a case by the image forming apparatus 101 and the management apparatus 105, when an error is generated, is described below. The following description of processing to be performed when an error is generated in the image forming apparatus 101 according to the present exemplary embodiment is limited to a part that is different from the processing described in the first exemplary embodiment.

In the third exemplary embodiment, the management apparatus 105 performs processing for determining whether to store the event relevant information received from the image forming apparatus 101 as new information or additional information for the previously received information, in addition to the processing described in the first exemplary embodiment. Further, if it is determined that the same event ID is used, the image forming apparatus 101 confirms whether the list number of the previous event relevant information is the same as a list number corresponding to the presently generated error, in addition to the processing described in the first exemplary embodiment.

Similar to the above-described exemplary embodiments, in the third exemplary embodiment, the image forming apparatus 101 stores the information illustrated in FIGS. 8, 25, and 26 in the storage device 206.

Further, similar to the above-described first exemplary embodiment, the management apparatus 105 includes functional blocks illustrated in FIG. 13. Further, in the present exemplary embodiment, the device data acquisition unit 1308 performs processing for determining a storage method for the event relevant information received from the image forming apparatus 101.

In the present exemplary embodiment, the device data acquisition unit 1308 determines the storage method with reference to the event ID 1005 included in the event relevant information received from the image forming apparatus 101 and the error history information (see FIG. 14) of the image forming apparatus 101 stored in the storage device 1108, as described below in more detail.

Similar to the above-described exemplary embodiments, the management apparatus 105 stores the information illustrated in FIGS. 14 and 16 in the storage device 1108.

Figure 29:
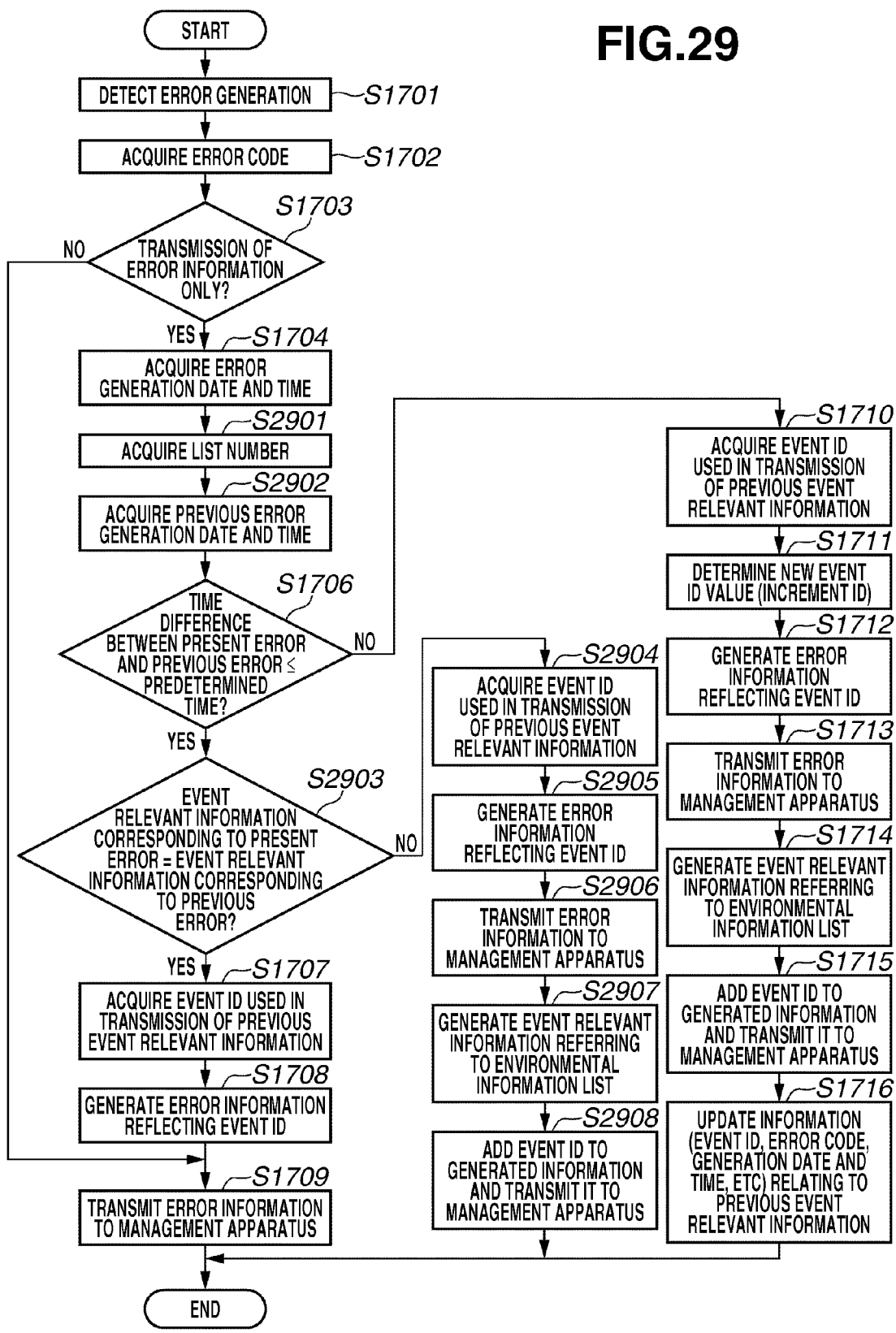
FIG. 29 is a flowchart illustrating an example of processing that can be performed by the image forming apparatus, when an error is generated, according to a third exemplary embodiment of the present invention.

FIG. 29 is a flowchart illustrating an example of processing that can be performed by the image forming apparatus 101 according to the above-described program, when an error is generated, in the present exemplary embodiment. The following description of processing according to the present exemplary embodiment is limited to a part that is different from the above-described processing described with reference to FIG. 17. Further, in the present exemplary embodiment, it is assumed that the error generated in the image forming apparatus 101 is the same as the example error illustrated in FIG. 7.

In step S1704, the image forming apparatus 101 acquires generation date and time information relating to the presently generated error stored in the RAM 205. In step S2901, the image forming apparatus 101 acquires a list number with reference to the list (see FIG. 25) stored in the storage device 206, which stores specific error codes serving as the transmission target with respect to the event relevant information. The image forming apparatus 101 stores the acquired list number in the RAM 205. In step S2902, the image forming apparatus 101 acquires error generation date and time information with reference to the information (see FIG. 8) relating to the previously transmitted event relevant information which is stored in the storage device 206.

In step S1706, the image forming apparatus 101 determines whether the occurrence of the present error is within a predetermined period of time (e.g., one minute) from the generation timing of the previous error. If it is determined that the occurrence of the present error is within the predetermined period of time (YES in step S1706), the processing proceeds to step S2903. If it is determined that the occurrence of the present error is not within the predetermined period of time (NO in step S1706), the processing proceeds to step S1710. According to the examples illustrated in FIGS. 7 and 8, the occurrence of the present error is within one minute. Therefore, the processing proceeds to step S2903.

In step S2903, the image forming apparatus 101 determines whether the event relevant information to be transmitted to the management apparatus 105 in response to the presently generated error is the same as that of the previously generated error. The image forming apparatus 101 acquires a list number corresponding to the previously generated error code 802 with reference to the specific error code list illustrated in FIG. 25. Further, the image forming apparatus 101 acquires a list number corresponding to the presently generated error code 703 and stores the acquired list numbers in the storage device 206. If it is determined that the acquired list numbers are identical with each other (YES in step S2903), the image forming apparatus 101 determines that the same information is transmitted and the processing proceeds to step S1707. If it is determined that the acquired list numbers are different from each other (NO in step S2903), the image forming apparatus 101 determines that different information is transmitted and the processing proceeds to step S2904. According to the examples illustrated in FIGS. 7, 8, and 25, the same list number 600 is transmitted to the management apparatus 105. Therefore, the processing proceeds to step S1707.

In step S2904, the image forming apparatus 101 acquires an event ID with reference to the information (see FIG. 8) relating to the previously transmitted event relevant information which is stored in the storage device 206. In step S2905, the image forming apparatus 101 generates error information (see FIG. 9) to be transmitted to the management apparatus 105 based on the presently generated error information which is stored in the RAM 205 in step S1702. The image forming apparatus 101 stores an event ID value that is identical to the event ID value set for the previously transmitted event relevant information acquired in step S2904. In step S2906, the image forming apparatus 101 transmits the error information generated in step S2905 to the management apparatus 105 via the network I/F 202.

In step S2907, the image forming apparatus 101 acquires the list number corresponding to the presently generated error code 703 that is stored in the storage device 206 in step S2903. The apparatus information output unit 411 generates event relevant information based on the list number with reference to the list of the information (environmental information) illustrated in FIG. 26 to be transmitted to the management apparatus 105 which is stored in the storage device 206. The image forming apparatus 101 stores the acquired information in the RAM 205. In step S2908, the image forming apparatus 101 adds the event ID acquired in step S2904 to the event relevant information generated in step S2907. Then, the image forming apparatus 101 transmits the event relevant information with the added event ID to the management apparatus 105 via the network I/F 202.

Figure 30:
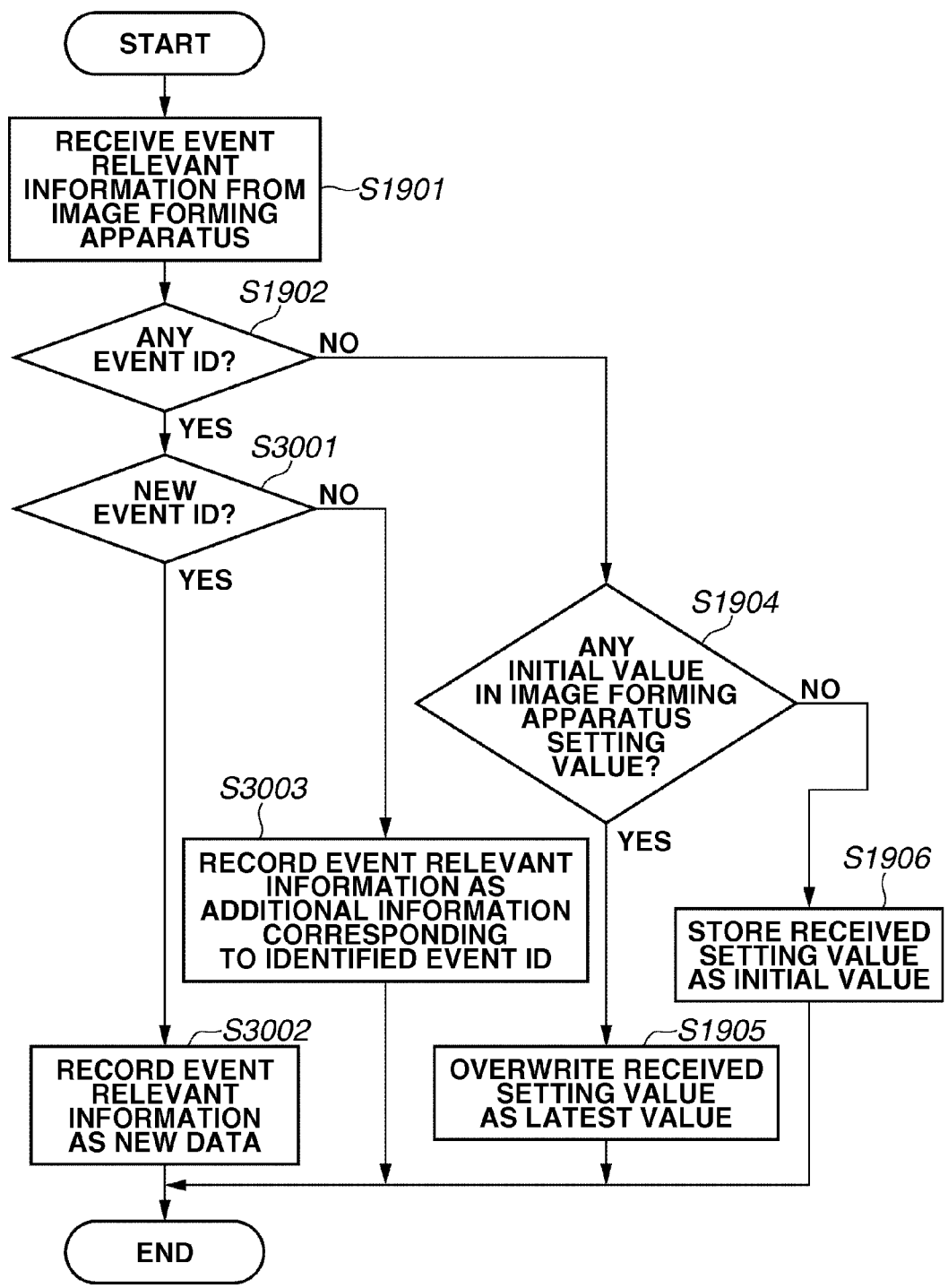
FIG. 30 is a flowchart illustrating an example of processing that can be performed by the management apparatus, when event relevant information is received, according to the third exemplary embodiment.

FIG. 30 is a flowchart illustrating an example of processing that can be performed by the management apparatus 105 according to the above-described program. The following description of processing according to the present exemplary embodiment is limited to a part that is different from the above-described processing illustrated in FIG. 19 to be performed by the management apparatus 105 when event relevant information is received.

In step S1902, the management apparatus 105 checks whether the received event relevant information includes any event ID with reference to the event relevant information stored in the RAM 1104 in step S1901. If it is determined that the received event relevant information includes an event ID (YES in step S1902), the management apparatus 105 determines that the received event relevant information (including the environmental information) is transmitted in response to generation of an error. Then, the processing proceeds to step S3001. If it is determined that the received event relevant information does not include any event ID (NO in step S1902), the management apparatus 105 determines that the received event relevant information (including setting values) is transmitted in response to a setting change. Then, the processing proceeds to step S1904.

In step S3001, the management apparatus 105 determines whether the included event ID is a new event ID. The management apparatus 105 compares an event ID of the event relevant information corresponding to a previously received error included in the error history information stored in the storage device 1108 with an event ID included in the presently received event relevant information acquired in step S1902. If it is determined that the compared event IDs are different from each other, the management apparatus 105 confirms reception of new information (YES in step S3001), the processing proceeds to step S3002. If it is determined that the compared event IDs are identical to each other, the management apparatus 105 confirms reception of additional information (NO in step S3001), the processing proceeds to step S3003.

In step S3002, the management apparatus 105 records the event relevant information stored in the RAM 1104 in step S1901 as new information, as illustrated in FIG. 16. The information recorded and managed through the processing of step S3002 is stored in the storage device 1108.

In step S3003, the management apparatus 105 records the event relevant information stored in the RAM 1104 in step S1901, as additional information to be added to the information including the corresponding event ID. The information recorded and managed through the processing of step S3003 is stored in the storage device 1108.

The present exemplary embodiment can change event relevant information to be transmitted to the management apparatus 105 according to each generated event. Further, when a plurality of different types of errors occur substantially at the same time, additional event relevant information can be recorded, as information relating to errors frequently generated at substantially the same timing, in the management apparatus 105. Therefore, the information required for failure analysis and maintenance can be easily confirmed.

A fourth exemplary embodiment of the present invention is different from the above-described first to third exemplary embodiments in that the management apparatus 105 determines whether to store the event relevant information received from the image forming apparatus 101. In the present exemplary embodiment, similar to other exemplary embodiment, transmission of event relevant information is performed exclusively for the specific event (error, setting change relating to image formation, etc). Therefore, the present exemplary embodiment can reduce the amount of required communications. In addition, the management apparatus 105 stores only the necessary information among the event relevant information received from the image forming apparatus 101. Therefore, the present exemplary embodiment can reduce the amount of managed data to a minimum level.

An example of processing to be performed by the image forming apparatus 101 and the management apparatus 105, when an error is generated, according to the present exemplary embodiment is described below. The following description of processing according to the present exemplary embodiment is limited to a part that is different from the above-described processing according to the first exemplary embodiment to be performed when an error is generated in the image forming apparatus 101. The present exemplary embodiment is different from the first exemplary embodiment in that the image forming apparatus 101 transmits the event relevant information to the management apparatus 105 in response to occurrence of each error.

Similar to the above-described exemplary embodiments, the image forming apparatus 101 according to the present exemplary embodiment stores the information illustrated in FIGS. 5, 8, and 26 in the storage device 206.

Similar to the first exemplary embodiment, the management apparatus 105 includes functional blocks illustrated in FIG. 13 and stores the information illustrated in FIG. 16. In the fourth exemplary embodiment, the device data acquisition unit 1308 illustrated in FIG. 13 performs processing for determining whether to store the event relevant information received from the image forming apparatus 101.

FIG. 31 illustrates an example of a list including error history information relating to the image forming apparatus 101 that can be managed by the management apparatus 105 according to the present exemplary embodiment of the present invention. In the present exemplary embodiment, the list illustrated in FIG. 31 is stored in the storage device 1108.

Error history information 3101 received from the image forming apparatus 101 includes information relating to each history, such as error generation date and time, a total counter value, an error code, and an event ID. In the present exemplary embodiment, if it is determined that no event relevant information is to be transmitted for a generated error, no data is set as event ID information. Further, the above-described history information indicates the contents of the history at the reception timing of the event relevant information.

Figure 32:
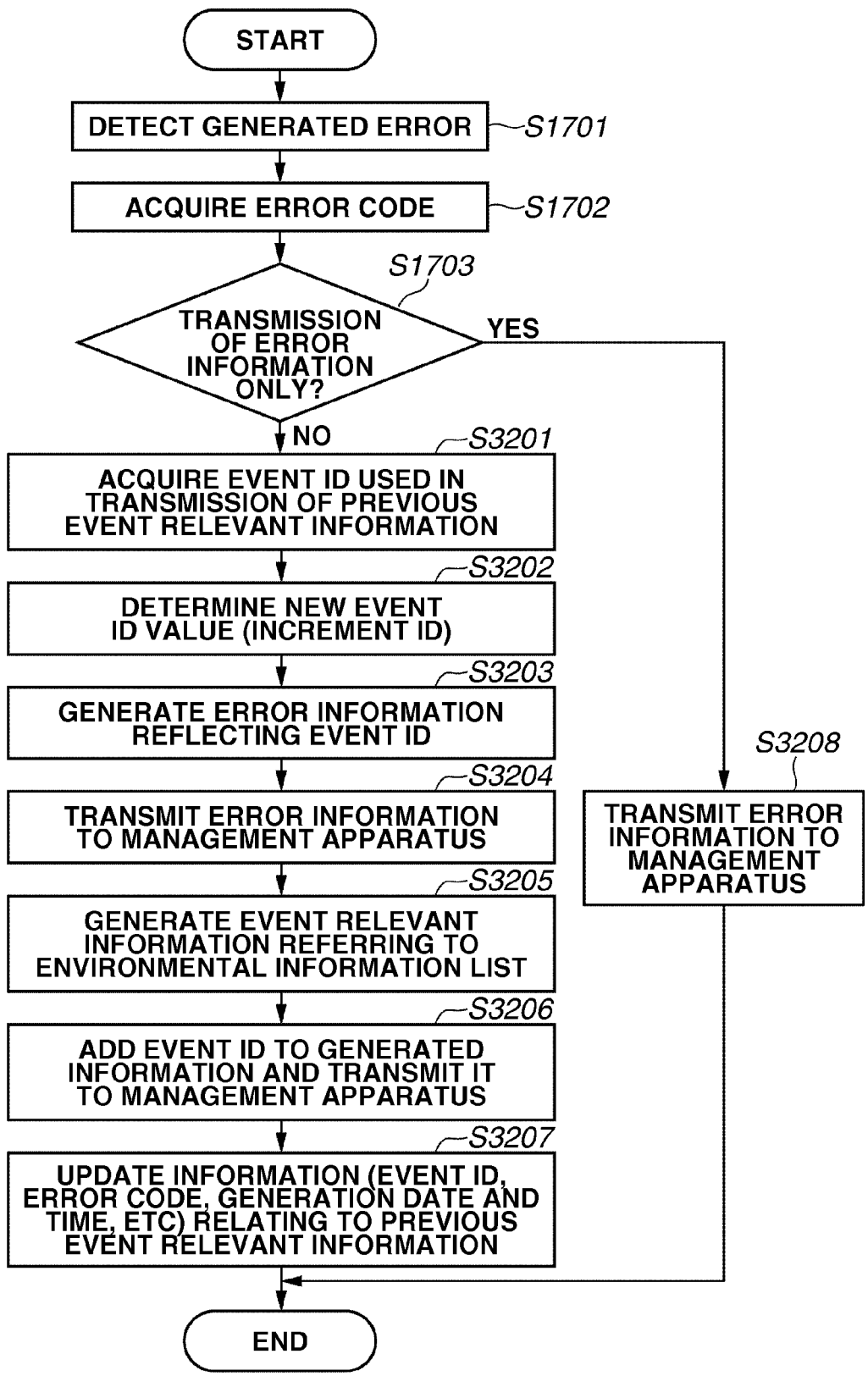
FIG. 32 is a flowchart illustrating an example of processing that can be performed by the image forming apparatus, when an error is generated, according to the fourth exemplary embodiment.

FIG. 32 is a flowchart illustrating an example of processing that can be performed by the image forming apparatus 101 according to the above-described program, when an error is generated, in the present exemplary embodiment. The following description of processing according to the present exemplary embodiment is limited to a part that is different from the above-described processing described with reference to FIG. 17. Further, in the present exemplary embodiment, it is assumed that the error generated in the image forming apparatus 101 is the same as the example error illustrated in FIG. 7.

In step S1703, the image forming apparatus 101 determines whether an error code of the presently generated error which is stored in the RAM 205 in step S1702 is a transmission target that requires transmission of event relevant information. If it is determined that the presently generated error is the transmission target (NO in step S1703), the processing proceeds to step S3201. If it is determined that the presently generated error is not the transmission target (YES in step S1703), the processing proceeds to step S3208. According to the example illustrated in FIG. 7, the presently generated error is the transmission target. Therefore, the processing proceeds to step S3201.

In step S3201, the image forming apparatus 101 acquires an event ID with reference to the information (see FIG. 8) relating to the previously transmitted event relevant information which is stored in the storage device 206. In step S3202, the image forming apparatus 101 determines a new ID value based on the event ID acquired in step S3201. In the present exemplary embodiment, the image forming apparatus 101 increments the ID value by one. In step S3203, the image forming apparatus 101 generates error information (see FIG. 9) to be transmitted to the management apparatus 105 based on the presently generated error information which is stored in the RAM 205 in step S1702. The image forming apparatus 101 stores an event ID value that is identical to the event ID value determined in step S3202. In step S3204, the image forming apparatus 101 transmits the error information generated in step S3203 to the management apparatus 105 via the network I/F 202.

In step S3205, the apparatus information output unit 411 generates event relevant information with reference to the environmental information list (see FIG. 6) stored in the storage device 206. In step S3206, the image forming apparatus 101 adds the event ID determined in step S3202 to the generated event relevant information and transmits the event relevant information with the added event ID to the management apparatus 105 via the network I/F 202.

In step S3207, the image forming apparatus 101 updates the information (see FIG. 8) relating to the previous event relevant information which is stored in the storage device 206. The image forming apparatus 101 stores an event ID value that is identical to the event ID value determined in step S3202 and stores error generation date and time information and error code data that are identical to the presently generated error information stored in the RAM 205 in step S1702.

In step S3208, the image forming apparatus 101 generates error information (see FIG. 9) based on the presently generated error information which is stored in the RAM 205 in step S1702. In the present exemplary embodiment, the image forming apparatus 101 does not set any event ID value. Further, the image forming apparatus 101 transmits the generated error information to the management apparatus 105 via the network I/F 202.

Figure 33:
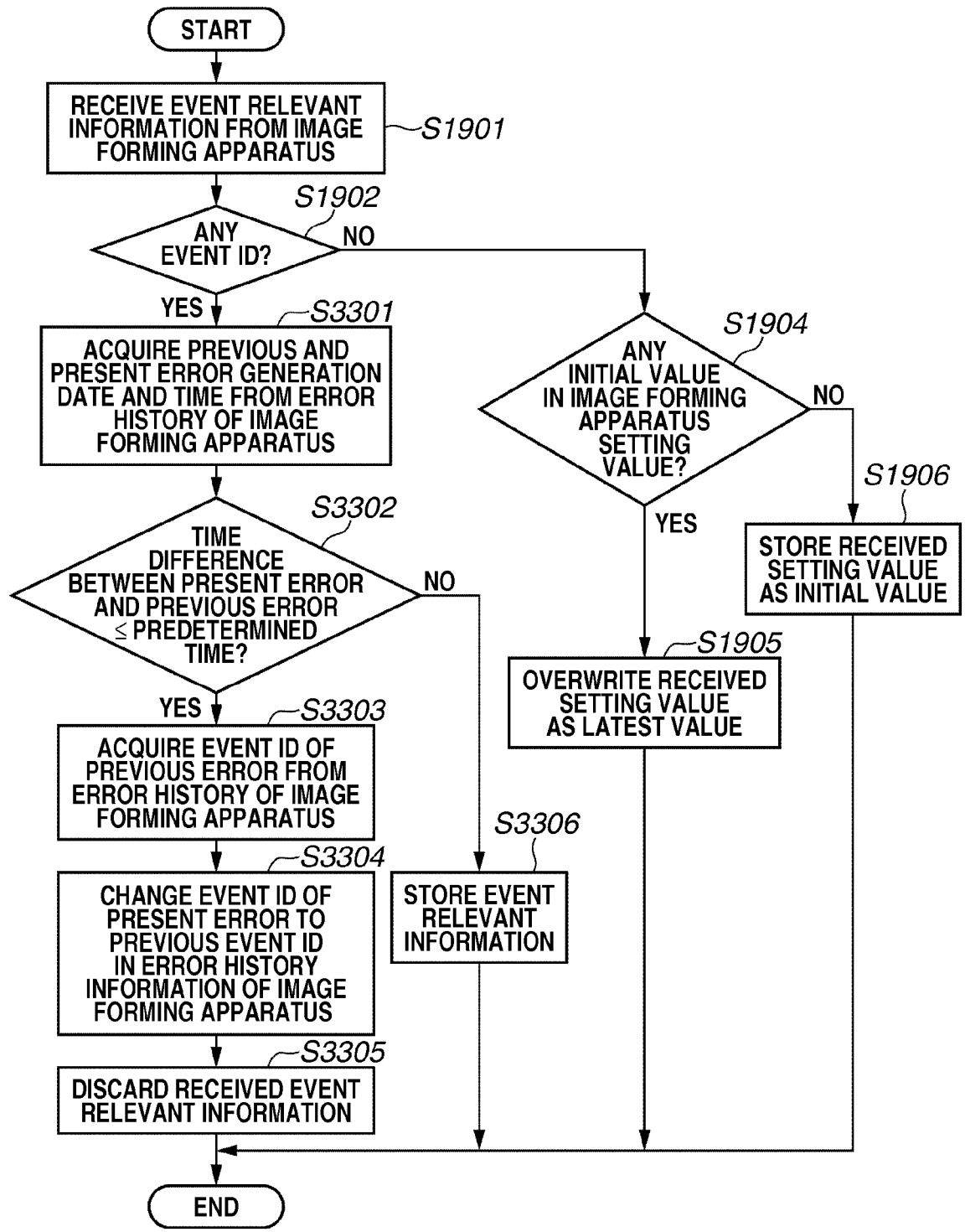
FIG. 33 is a flowchart illustrating an example of processing that can be performed by the management apparatus, when event relevant information is received, according to the fourth exemplary embodiment.

FIG. 33 is a flowchart illustrating an example of processing that can be performed by the management apparatus 105 according to the above-described program in the present exemplary embodiment. The following description of processing according to the present exemplary embodiment is limited to a part that is different from the above-described processing described with reference to FIG. 19.

In step S1902, the management apparatus 105 checks whether the received event relevant information includes any event ID with reference to the event relevant information stored in the RAM 1104 in step S1901. If it is determined that the received event relevant information includes an event ID (YES in step S1902), the management apparatus 105 determines that the received event relevant information (environmental information) is transmitted in response to generation of an error. Then, the processing proceeds to step S3301. If it is determined that the received event relevant information does not include any event ID (NO in step S1902), the management apparatus 105 determines that the received event relevant information (setting values) is transmitted in response to a setting change. Then, the processing proceeds to step S1904.

In step S3301, the management apparatus 105 acquires error generation date and time corresponding to the event ID included in the presently received event relevant information and previous error generation date and time from the error history information of the image forming apparatus 101 stored in the storage device 1108. In the present exemplary embodiment, the management apparatus 105 receives the error information illustrated in FIG. 9 from the image forming apparatus 101. Therefore, the event ID 905 is 4501. By referring to the error history illustrated in FIG. 31, the error generation date and time corresponding to the event ID 905 is 2008/05/15 11:49. Further, the previous error generation date and time is 2008/05/15 11:48.

In step S3302, the management apparatus 105 compares the present error generation date and time with the previous error generation date and time acquired in step S3301, and determines whether the occurrence of the present error is within a predetermined period of time (e.g., one minute) from the generation timing of the previous error. If it is determined that the occurrence of the present error is within the predetermined period of time (YES in step S3302), the management apparatus 105 determines that it is not necessary to store the presently received event relevant information and the processing proceeds to step S3303. If it is determined that the occurrence of the present error is not within the predetermined period of time (NO in step S3302), the management apparatus 105 determines that it is necessary to store the presently received event relevant information and the processing proceeds to step S3306. According to the examples illustrated in FIGS. 9 and 31, it is understood that the occurrence of the present error is within one minute. Therefore, the processing proceeds to step S3303.

In step S3303, the management apparatus 105 acquires an event ID associated with the previously generated error from the error history information of the image forming apparatus 101 stored in the storage device 1108. In the present exemplary embodiment, it is understood from FIG. 31 that the event ID of the previous error is 4500. In step S3304, the management apparatus 105 changes the event ID of the presently generated error to the event ID acquired in step S3303 in the error history information of the image forming apparatus 101 which is stored in the recording apparatus 1108. In step S3305, the management apparatus 105 discards the event relevant information stored in the RAM 1104 in step S1901.

In step S3306, the management apparatus 105 stores the information illustrated in FIG. 16 in the recording apparatus 1108 based on the event relevant information stored in the RAM 1104 in step S1901.

The present invention can also be realized by executing the following process. That is, a process in which a software (program) that realizes the functions of the above-described embodiments is supplied to the system or apparatus via a network or a recording medium of various types, and then a computer of the system or apparatus (or devices such as CPU or MPU) reads out the program and executes it. In such a case, the recording medium where the program is stored as well as the program are included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-021554 filed Feb. 2, 2009, which is hereby incorporated by reference herein in its entirety.

What is claimed is:

1. A method for a management apparatus that can manage a plurality of image forming apparatuses via a network, the method comprising:

receiving, from the image forming apparatus, event information and event relevant information that includes environmental information including at least one of temperature, moisture, and electric potential which are measured in the image forming apparatus or a plurality of setting values relating to image formation, and storing the received event information and the event relevant information; and providing a screen that enables a user to view the stored event information and the stored event relevant information, wherein when a plurality of events is detected in the image forming apparatus within a predetermined period of time, event relevant information is not transmitted for all of the detected plurality of events, and same event ID is set for event information so that event relevant information which is transmitted at least once can be associated with the plurality of events, the event information and the event relevant information which include the same event ID are managed in association with each other, and the provided screen enables the user to confirm the event information in association with the environmental information, and enables the user to confirm the environmental information in association with the plurality of setting values relating to image formation.

2. An image forming apparatus, comprising:

an acquisition unit configured to acquire environmental information including at least one of temperature, moisture, and electric potential which are measured in the image forming apparatus;

a detection unit configured to detect an event in the image forming apparatus;

an event information transmission unit configured to transmit, to a management apparatus, event information relating to the event detected by the detection unit, wherein the event information includes counter information when the event has been detected;

an event relevant information transmission unit configured to transmit event relevant information to which an event ID is set, when it is determined that event relevant information including the environmental information acquired by the acquisition unit is to be transmitted together with the event detected by the detection unit; and a management unit configured to manage corresponding information including the event detected by the detection unit and the event ID set for the event relevant information transmitted by the event relevant information transmission unit, wherein an event ID is set for the event information so that the management apparatus can manage the event information in association with the event relevant information, and wherein if it is determined that event relevant information is to be transmitted together with a present event newly detected by the detection unit in a case where it is determined that environmental information corresponding to the present event has been transmitted as the event relevant information to the management apparatus based on the corresponding information managed by the management unit, (1) the event relevant information transmission unit does not transmit event relevant information corresponding to the present event, and (2) the event information transmission unit sets the event ID which is set for the event relevant information corresponding to the previous event managed by the management unit, as event information relating to the present event and transmits the set event information to the management apparatus.

3. The image forming apparatus according to claim 2, wherein when it is determined that the event detected by the detection unit is failure information, environmental information including at least one of temperature, moisture, and electric potential which are measured in the image forming apparatus is transmitted as event relevant information to the management apparatus.

4. The image forming apparatus according to claim 2, wherein when it is determined that the event detected by the detection unit is a change of a setting value relating to image formation, the event relevant information transmission unit transmits a plurality of setting values relating to the image formation which are set for the image forming apparatus to the management apparatus in response to the detection by the detection unit.

5. The image forming apparatus according to claim 2, wherein the detection unit detects, as the event, at least one of failure information, toner related information, status information and change information of a setting value related to image formation.

6. The image forming apparatus according to claim 2, wherein if it is determined that the event relevant information is to be transmitted together with a present event newly detected by the detection unit in a case where the present event is detected within a predetermined period of time after detection of a previous event and it is determined that environmental information corresponding to the present event has been transmitted as the event relevant information to the management apparatus based on the corresponding information managed by the management unit, (1) the event relevant information transmission unit does not transmit event relevant information corresponding to the present event, and (2) the event information transmission unit sets the event ID which is set for the event relevant information corresponding to the previous event managed by the management unit, as event information relating to the present event and transmits the set event information to the management apparatus.

7. The image forming apparatus according to claim 2, wherein the image forming apparatus is a printer or a multi-function peripheral which has at least two of a print function, a scan function, a copy function and a FAX function.

8. A method for an image forming apparatus, the method comprising:

acquiring, using a processor, environmental information including at least one of temperature, moisture, and electric potential which are measured in the image forming apparatus;

detecting, using the processor, an event in the image forming apparatus;

transmitting, using the processor, to a management apparatus, event information relating to the detected event;

transmitting, using the processor, event relevant information to which an event ID is set when it is determined that event relevant information including the environmental information acquired by the acquiring step is to be transmitted together with the detected event; and managing, using the processor, corresponding information including the event detected by the detecting step and the event ID set for the event relevant information transmitted event relevant information, wherein an event ID is set for the event information so that the management apparatus can manage the event information in association with the event relevant information, wherein if it is determined that event relevant information is to be transmitted together with a newly detected present event in a case where it is determined that environmental information corresponding to the present event has been transmitted as the event relevant information to the management apparatus based on the corresponding information managed by the managing step, (1) transmission of event relevant information corresponding to the present event is not performed, and (2) the event ID which is set for the event relevant information corresponding to the managed previous event, is set as event information relating to the present event and is transmitted to the management apparatus, and wherein the image forming apparatus is a printer or a multifunction peripheral which has at least two of a print function, a scan function, a copy function and a FAX function.

9. The method for an image forming apparatus according to claim 8, wherein the detecting step detects, as the event, at least one of failure information, toner related information, status information and change information of a setting value related to image formation.

10. A non-transitory computer readable storage medium on which a computer program for making a computer execute a method for an image forming apparatus is stored, the computer program for the method comprising:

computer-executable instructions for acquiring, using a processor, environmental information including at least one of temperature, moisture, and electric potential which are measured in the image forming apparatus;

computer-executable instructions for detecting, using the processor, an event in the image forming apparatus;

computer-executable instructions for transmitting, using the processor, to a management apparatus, event information relating to the detected event;

computer-executable instructions for transmitting, using the processor, event relevant information to which an event ID is set when it is determined that event relevant information including the environmental information acquired by the acquiring step is to be transmitted together with the detected event; and computer-executable instructions for managing, using the processor, corresponding information including the event detected by the detecting and the event ID set for the event relevant information transmitted event relevant information, wherein an event ID is set for the event information so that the management apparatus can manage the event information in association with the event relevant information, wherein if it is determined that event relevant information is to be transmitted together with a newly detected present event in a case where it is determined that environmental information corresponding to the present event has been transmitted as the event relevant information to the management apparatus based on the corresponding information managed by the managing, (1) transmission of event relevant information corresponding to the present event is not performed, and (2) the event ID which is set for the event relevant information corresponding to the managed previous event, is set as event information relating to the present event and is transmitted to the management apparatus, and wherein the image forming apparatus is a printer or a multifunction peripheral which has at least two of a print function, a scan function, a copy function and a FAX function.

11. The computer readable storage medium according to claim 10, wherein the detecting step detects, as the event, at least one of failure information, toner related information, status information and change information of a setting value related to image formation.

12. A management system including a plurality of image forming apparatuses and a management apparatus that can manage the plurality of image forming apparatuses via a network, wherein at least one of the plurality of image forming apparatuses comprises:

an acquisition unit configured to acquire environmental information including at least one of temperature, moisture, and electric potential which are measured in the image forming apparatus;

a detection unit configured to detect an event;

an event information transmission unit configured to transmit event information relating to the event detected by the detection unit to the management apparatus;

an event relevant information transmission unit configured to transmit event relevant information to which an event ID is set, when it is determined that event relevant information including the environmental information acquired by the acquisition unit is to be transmitted together with the event detected by the detection unit; and a management unit configured to manage corresponding information including the event detected by the detection unit and the event ID set for the event relevant information transmitted by the event relevant information transmission unit, wherein an event ID is set for the event information so that the management apparatus can manage the event information in association with the event relevant information, and wherein if it is determined that event relevant information is to be transmitted together with a present event newly detected by the detection unit in a case where it is determined that environmental information corresponding to the present event has been transmitted as the event relevant information to the management apparatus based on the corresponding information managed by the management unit, (1) the event relevant information transmission unit does not transmit event relevant information corresponding to the present event, and (2) the event information transmission unit sets the event ID which is set for the event relevant information corresponding to the previous event managed by the management unit, as event information relating to the present event and transmits the set event information to the management apparatus, wherein the management apparatus comprises:

a storage unit configured to store the event information and the event relevant information received from the at least one of the plurality of image forming apparatuses, while associating the event information with the event relevant information based on the event ID; and a providing unit configured to provide information required to view the event information and the event relevant information stored in the storage unit.

13. The management system according to claim 1, wherein a screen based on the information provided by the providing unit enables the user to perform a maintenance operation for the image forming apparatus from a remote place while viewing the information stored in the storage unit.

14. The management system according to claim 1, wherein a screen based on the information provided by the providing unit enables the user to confirm client information corresponding to the image forming apparatus.

* * * * *